United States Patent [19]

Ross et al.

[11] Patent Number: 5,709,800
[45] Date of Patent: Jan. 20, 1998

[54] ENVIRONMENTALLY ACCEPTABLE WASTE DISPOSAL BY HYDROTHERMAL DECOMPOSITION OF LABILE COMPOUNDS WITH NITRITE

[75] Inventors: David S. Ross, Palo Alto; Indira Jayaweera, Fremont, both of Calif.

[73] Assignee: SRI International, Menlo Park, Calif.

[21] Appl. No.: 652,920

[22] Filed: Jan. 16, 1996

Related U.S. Application Data

[63] Continuation-in-part of Ser. No. 91,617, Jul. 13, 1993, Pat. No. 5,409,617.
[51] Int. Cl.$^6$ .................................. C02F 1/02; C02F 1/72
[52] U.S. Cl. ................................................. 210/762; 210/763
[58] Field of Search ............................... 210/762, 761, 210/763; 588/218, 221, 226, 246, 239

[56] References Cited

U.S. PATENT DOCUMENTS

| | | | |
|---|---|---|---|
| 4,038,116 | 7/1977 | Andrews et al. | 149/105 |
| 4,098,627 | 7/1978 | Tompa et al. | 149/109.6 |
| 4,115,264 | 9/1978 | McCarthy et al. | 210/762 |
| 4,141,829 | 2/1979 | Thiel et al. | 210/63 R |
| 4,231,822 | 11/1980 | Roth | 149/109.6 |
| 4,338,199 | 7/1982 | Modell | 210/721 |
| 4,604,215 | 8/1986 | McCorquodale | 210/762 |
| 4,751,005 | 6/1988 | Mitsui et al. | 210/759 |
| 4,758,387 | 7/1988 | Sayles | 264/3.1 |
| 5,011,614 | 4/1991 | Gresser et al. | 210/761 |
| 5,057,220 | 10/1991 | Harada et al. | 210/762 |

FOREIGN PATENT DOCUMENTS

| | | | |
|---|---|---|---|
| 0129755 | 10/1979 | Japan | 210/762 |
| 706586 | 6/1954 | United Kingdom | 51/1 |

OTHER PUBLICATIONS

A. H. Lamberton, et al., *Journal of the Chemical Society*, "Studies of Nitroamines. Part VII. The Decomposition of Methylenedinitroamine in Aqueous Solutions", pp. 1650–1656 (1949).

J. C. Hoffsommer, et al., *Journal of Physical Chemistry*, "Kinetic Isotope Effects of Intermediate Formation for the Aqueous Alkaline Homogeneous Hydrolysis of 1,3,5-traiza-1,3,5-trinifrocyclohexane (RDX)", vol. 81 (#5), pp. 380–385 (1977).

"Wet Air Oxidation—Solving Today's Hazardous Wastewater Problems", Zimpro Process–Zimpro Inc, Environmental Control Systems, Rothschild, Wisconsin 54474.

Primary Examiner—Neil McCarthy
Attorney, Agent, or Firm—Peters, Verny, Jones & Biksa, L.L.P.

[57] ABSTRACT

The present invention relates to a process for the disposal of waste or the conversion of hydrothermally labile chemical groups and compounds to species which are environmentally acceptable, or are amendable to further degradation by conventional disposal systems to produce environmentally acceptable products, which process comprises:

(a) conveying an aqueous solution or slurry of the waste material into a reaction zone capable of withstanding the temperatures and pressures of hydrothermal decomposition;

(b) reacting the waste material in the reaction zone with an aqueous composition comprising catalyst selected from silica or one or more alkali metal silicates, borates, phosphates, biphosphates, or trisubstituted-phosphates, or comprising as promoting reagent independently selected from one or more alkali metal nitrites, alkaline earth metal nitrites or combinations thereof at between 200° C. and 500° C. and at a pressure between 10 and 400 atmospheres for between about 0.01 and 10 minutes;

(c) producing compounds which are environmentally acceptable or are amenable to further degradation by conventional disposal systems; and (d) optionally degrading further the compounds of step (c) by reaction in a conventional disposal system such as biological sewage treatment. The waste includes dairy process waste, military waste, ordnance waste, chemical process waste, agricultural waste and the like.

11 Claims, 10 Drawing Sheets

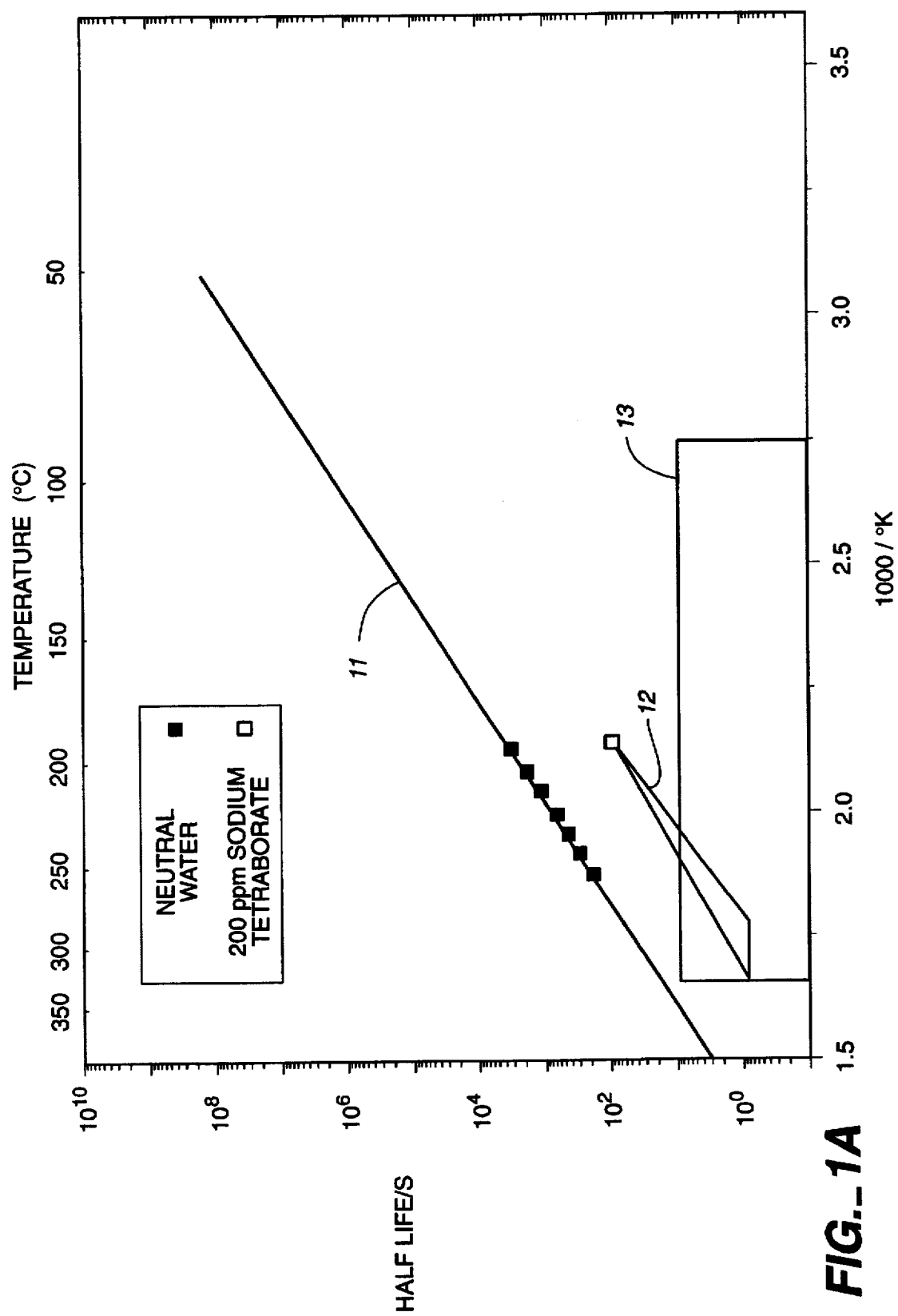
FIG._1A

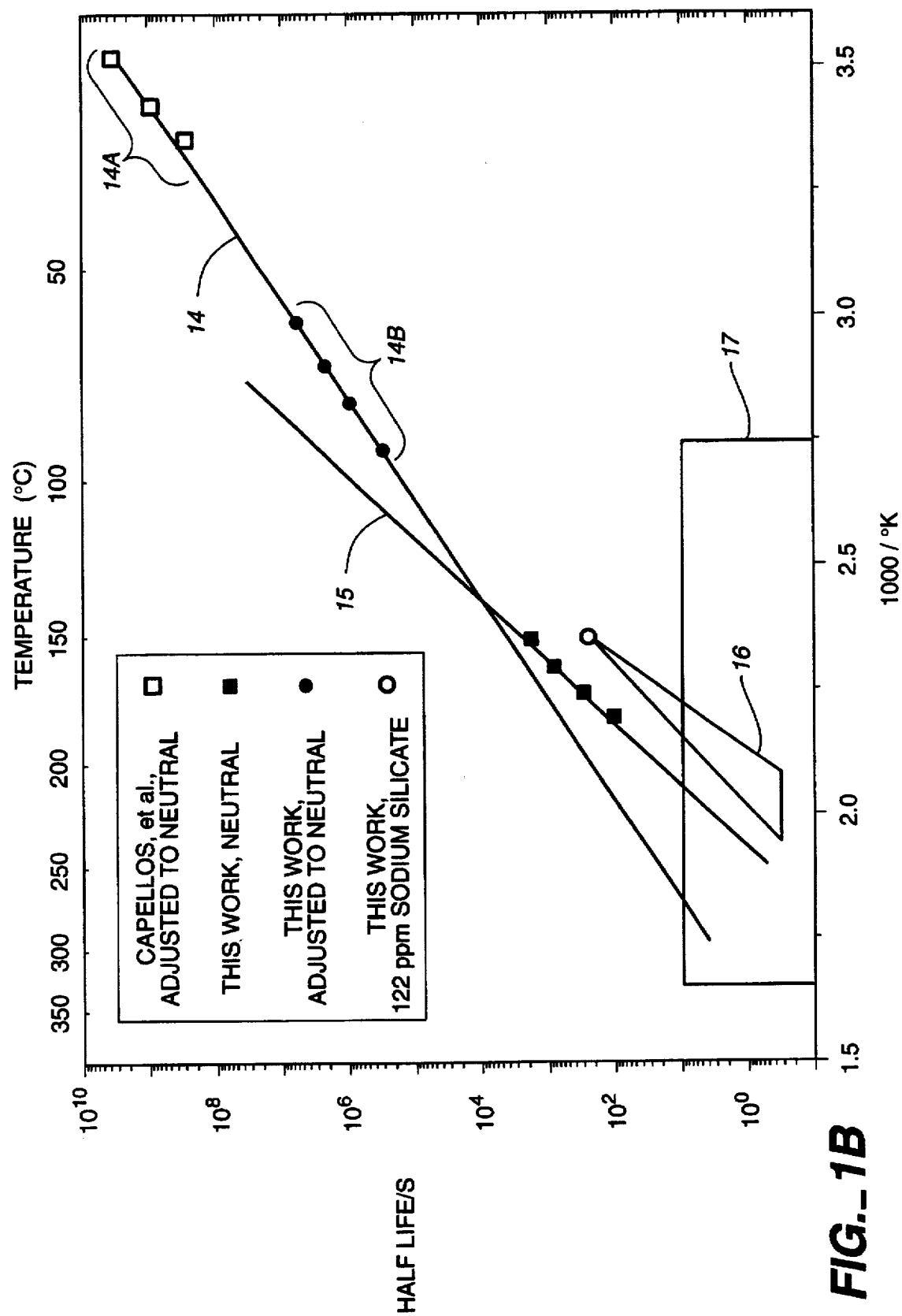
FIG._1B

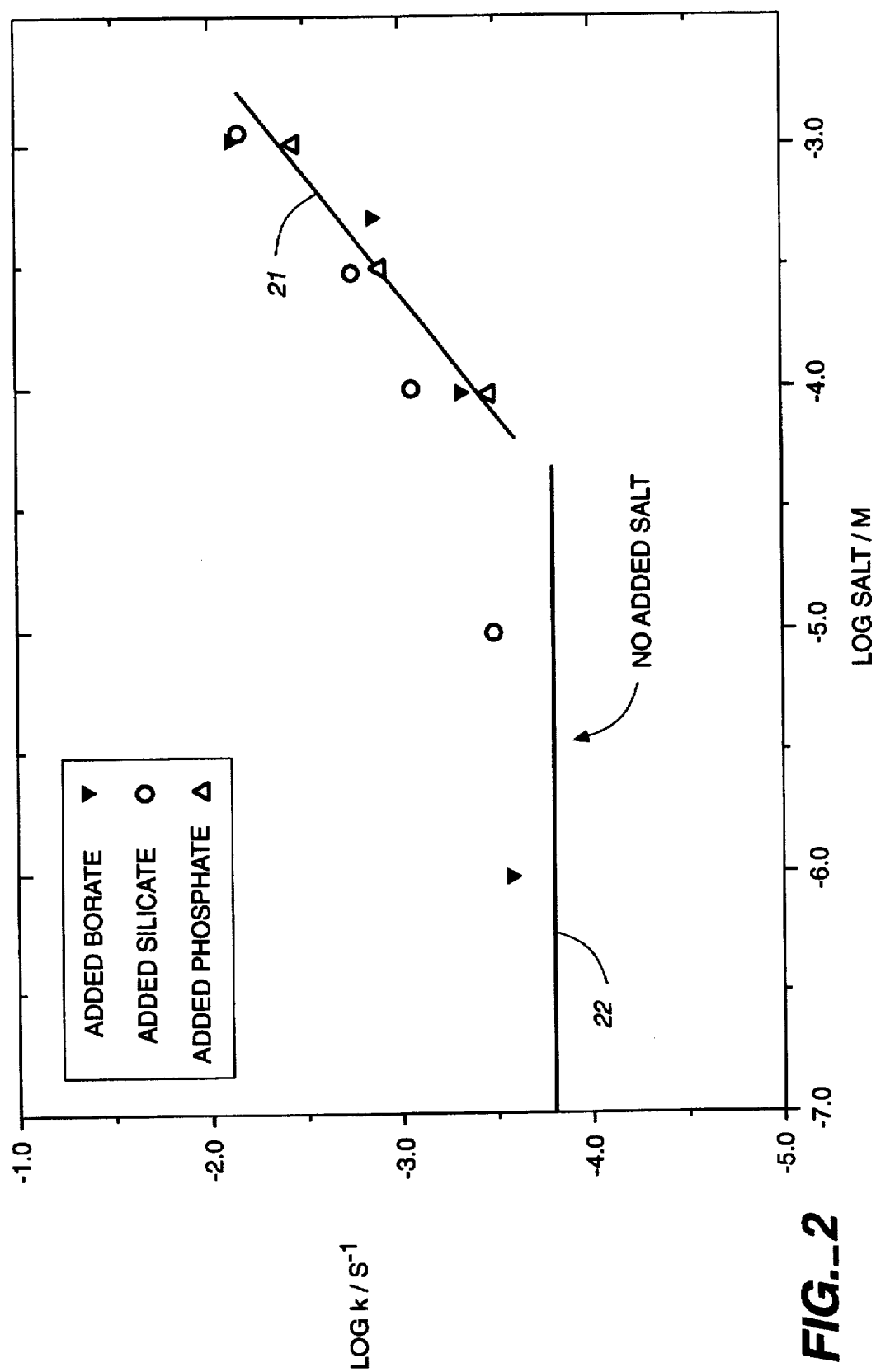
FIG._2

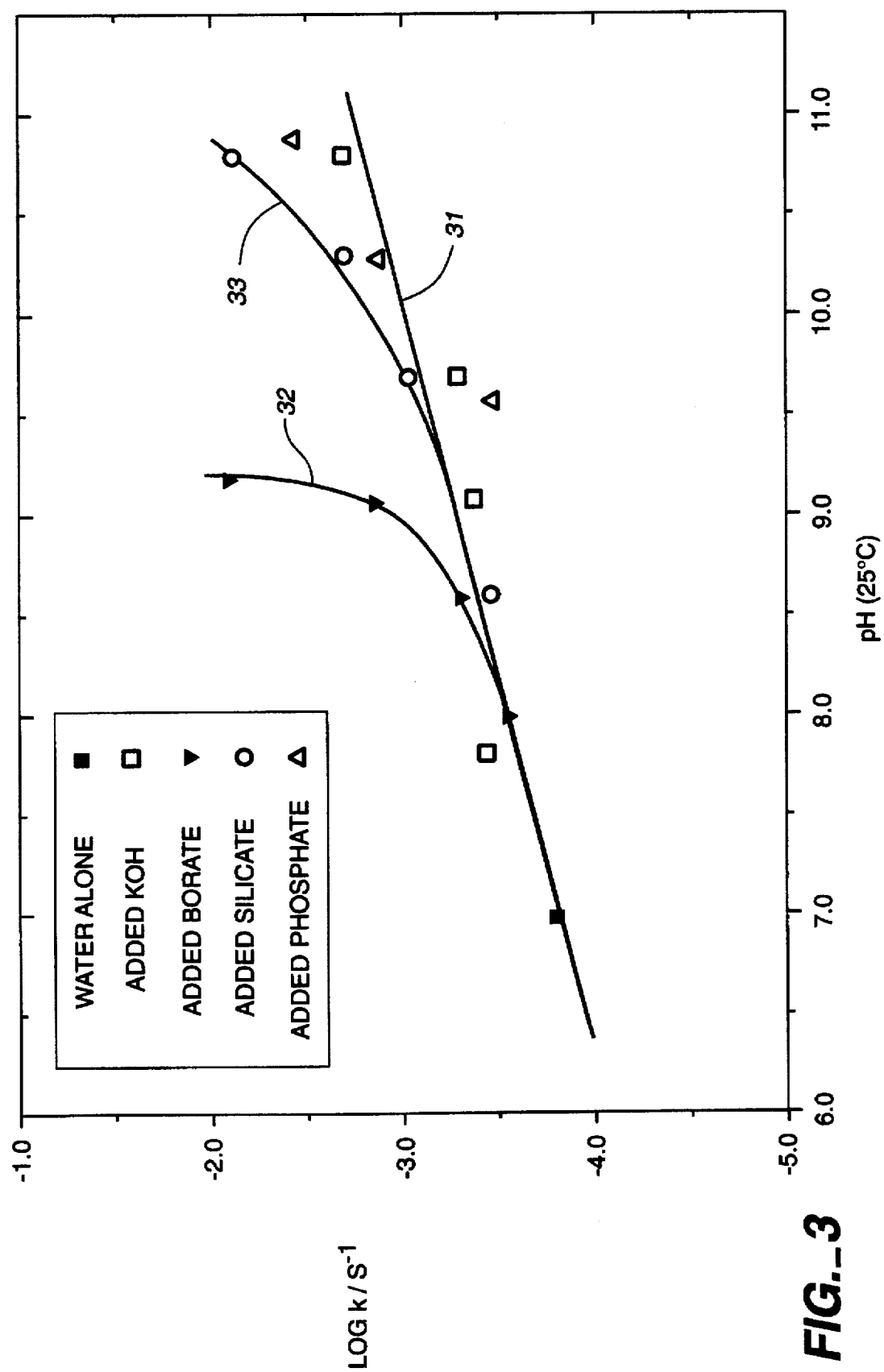
FIG._3

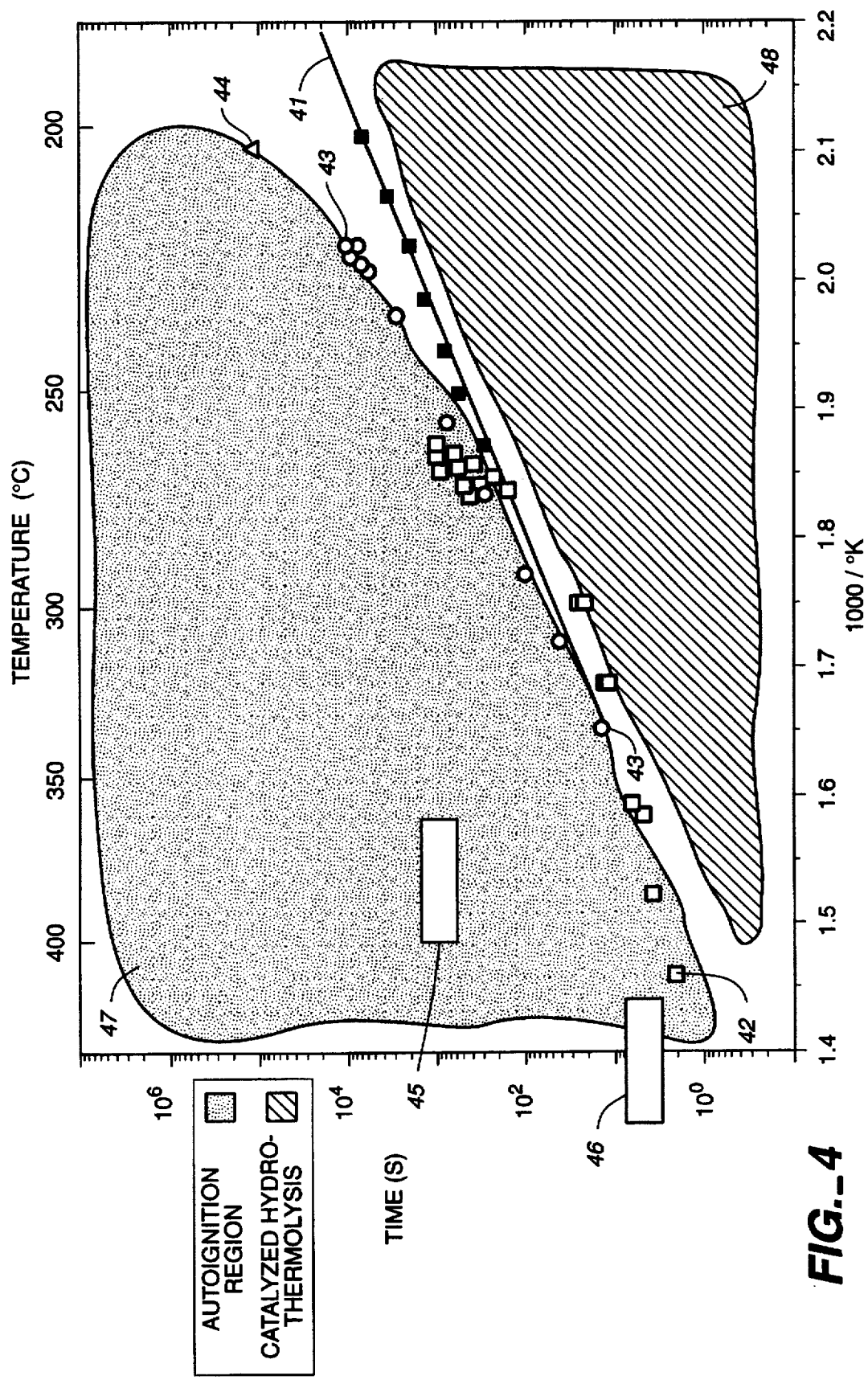
FIG._4

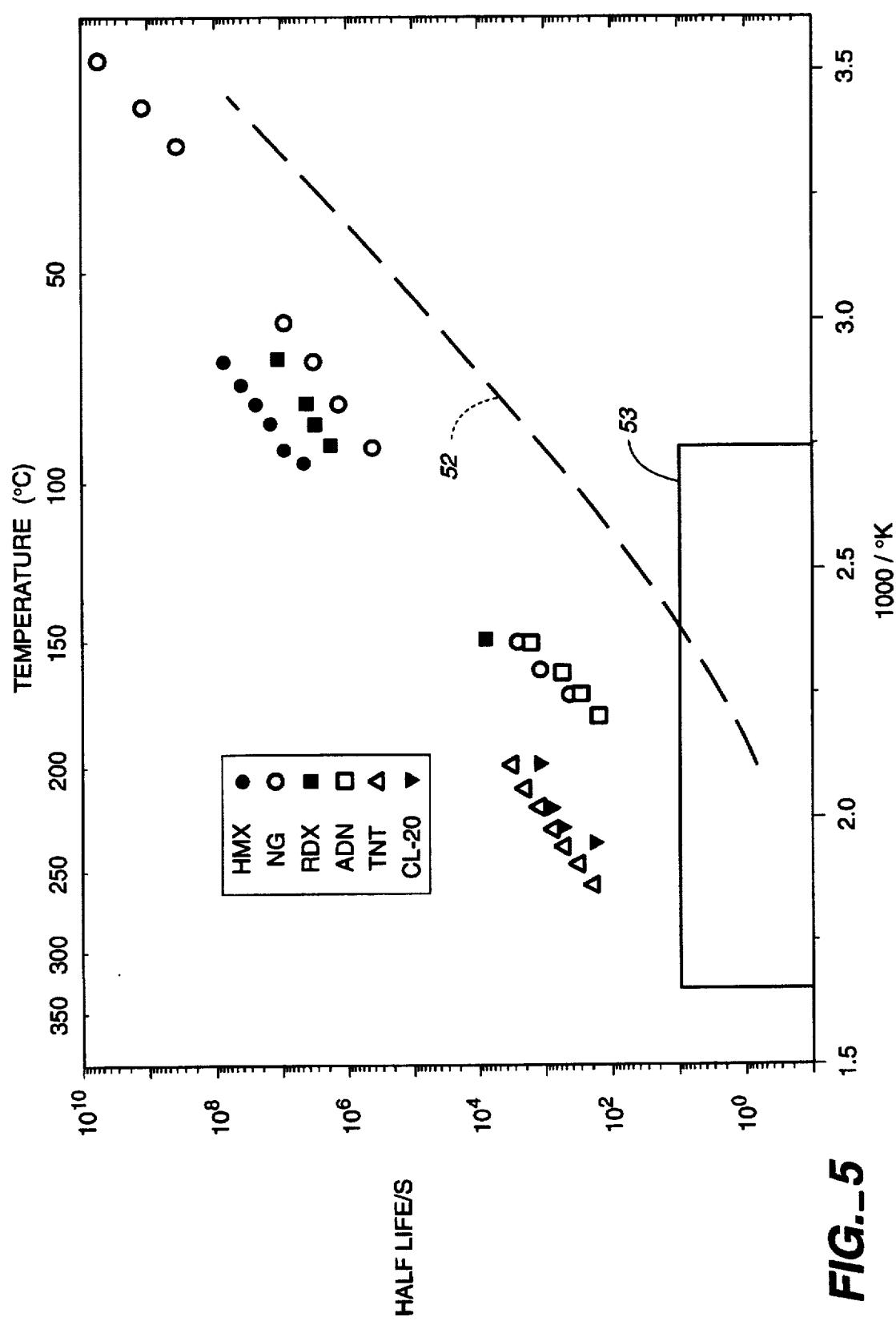
FIG._5

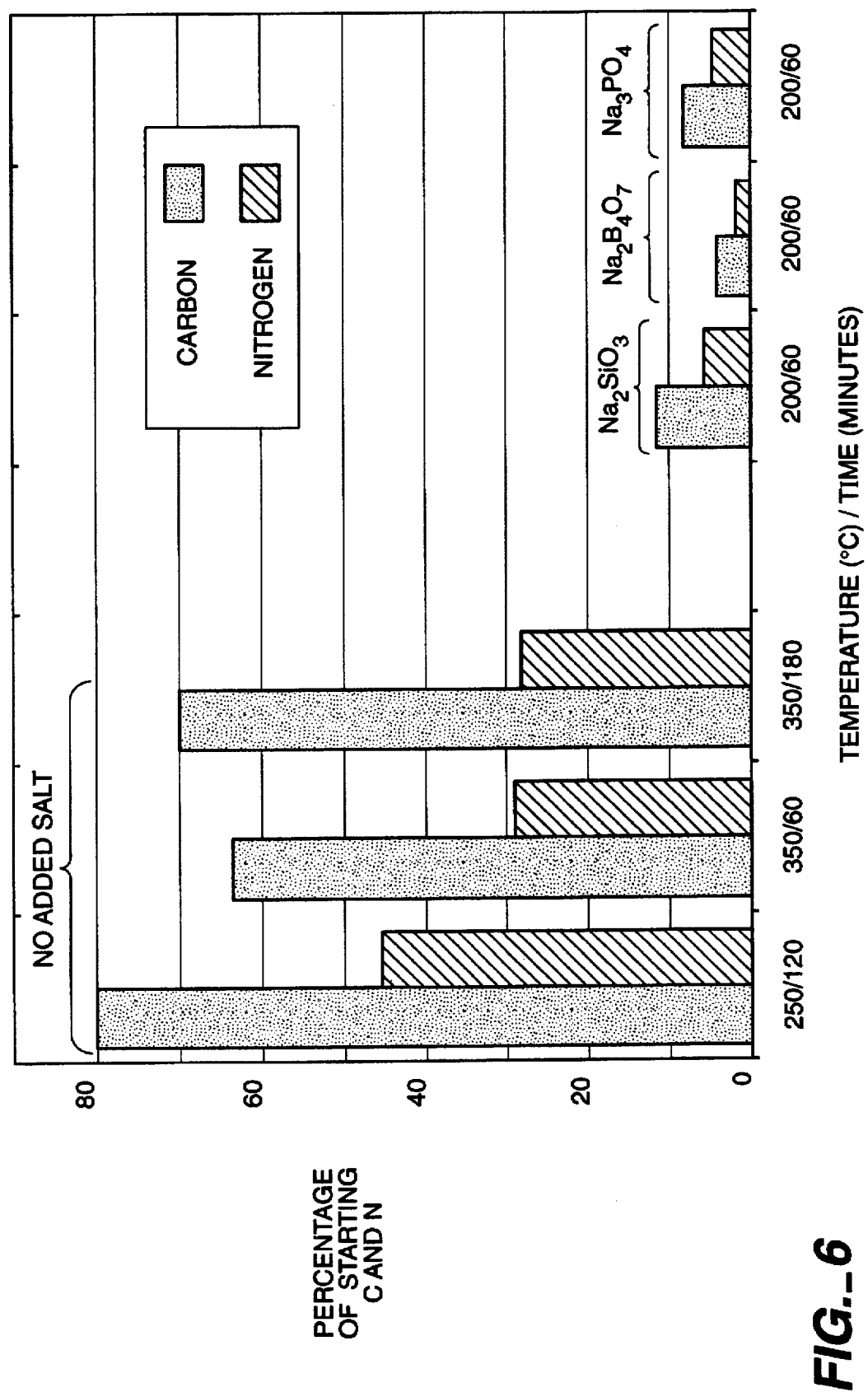
FIG._6

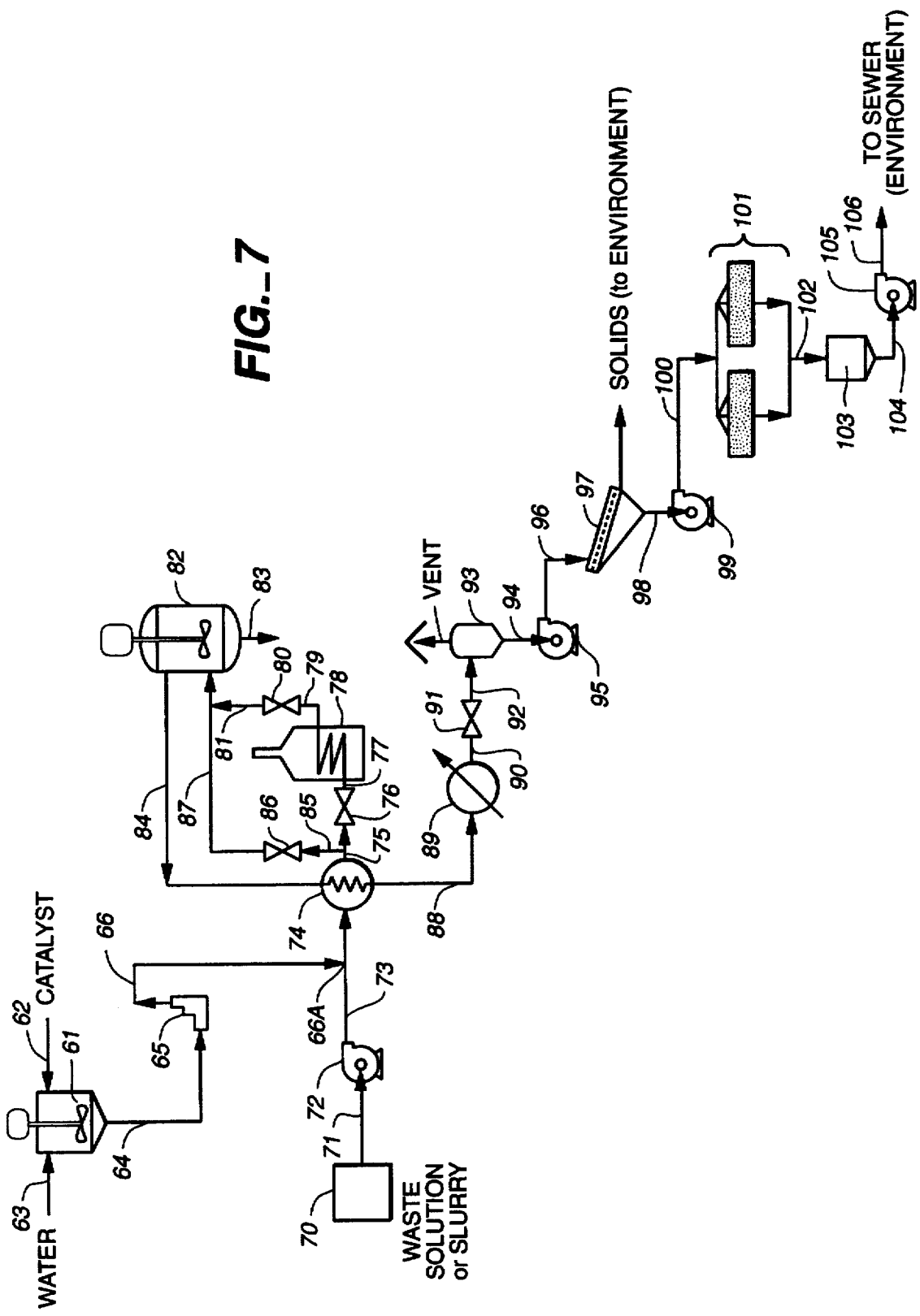
FIG._7

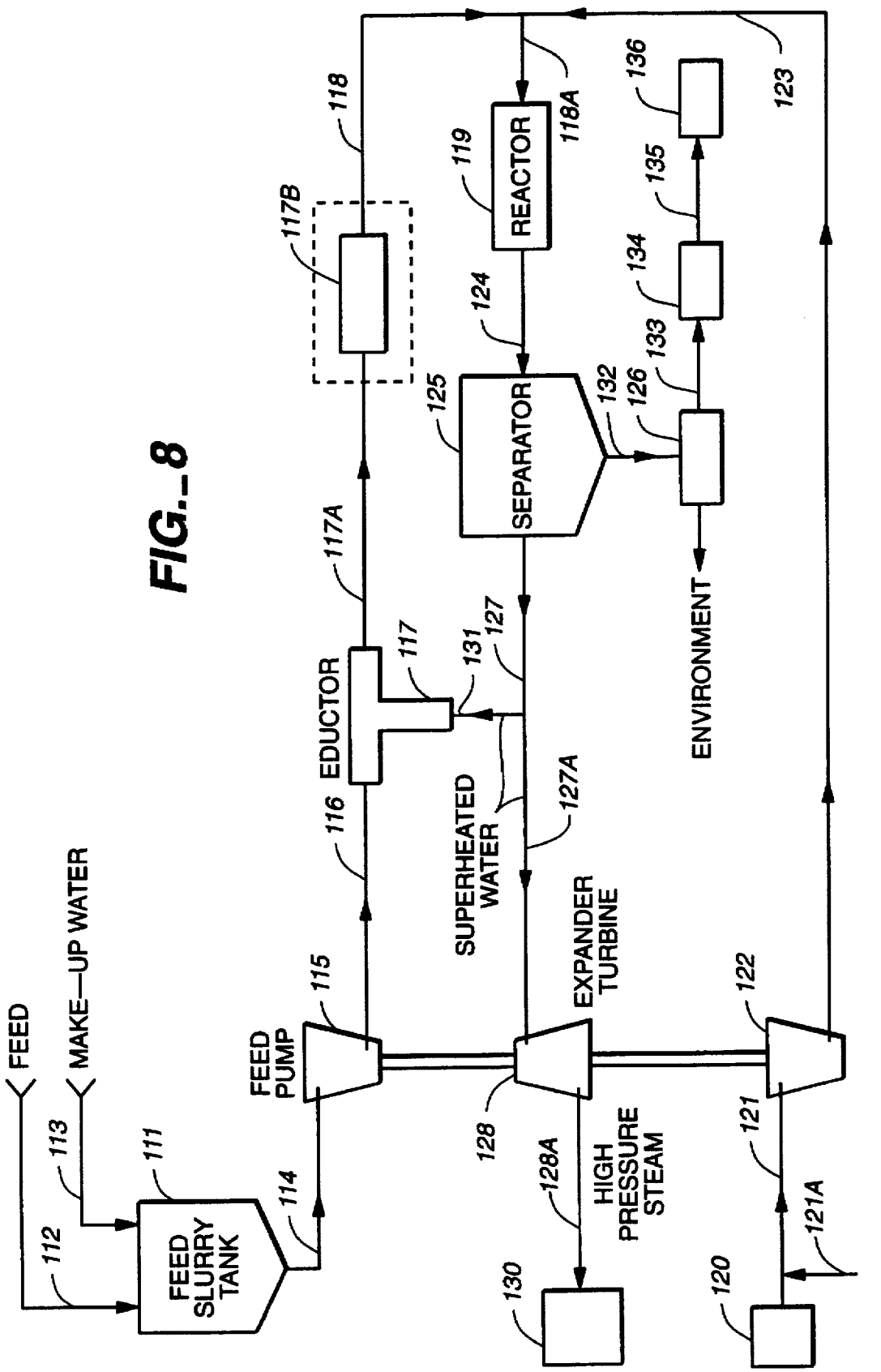
FIG._8

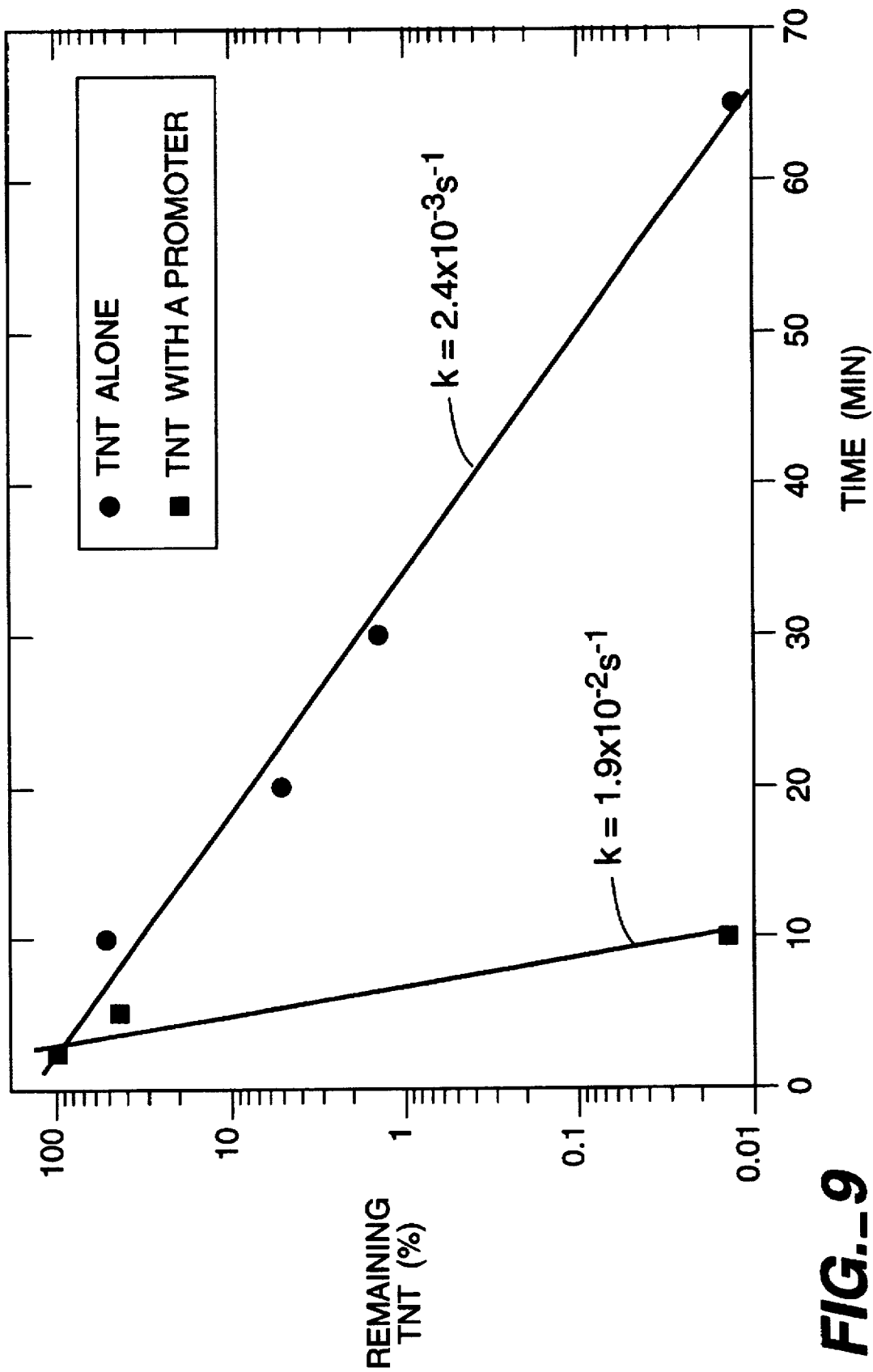
FIG._9

ENVIRONMENTALLY ACCEPTABLE WASTE DISPOSAL BY HYDROTHERMAL DECOMPOSITION OF LABILE COMPOUNDS WITH NITRITE

RELATED APPLICATIONS

This application is a continuation-in-part of PCT International Application No. PCT/US94/07870 filed Jul. 13, 1994, which is a continuation-in-part of U.S. Ser. No. 08/091,617, filed Jul. 13, 1993, now U.S. Pat. No. 5,409,617 which is incorporated by reference.

BACKGROUND OF THE INVENTION

1. Field of the Invention

The present invention concerns an improved process for the disposal of waste and the conversion of hydrothermally lablie chemical compounds to species which are environmentally acceptable or are more amenable to further degradation by conventional disposal systems to produce environmentally acceptable products. Specifically, the waste materials are reacted with specific aqueous inorganic salts as catalysts or promoting reagents at elevated temperature and pressure under hydrothermal decomposition conditions (having liquid water present), and when necessary the reaction product is optionally further degraded in a conventional disposal system.

2. Description of Related Art

Present waste treatment and disposal techniques involve land fill, disposal at sea, combustion in some form, or combinations thereof. General waste treatment and disposal techniques are well known in the art. See for example, N. L. Nemerow in "Industrial Wastes" in Kirk-Othmer: *Encyclopedia of Chemical Technology*, 3rd ed., Vol. 24, pp. 227–256, published in 1984; D. A. Tillman in "Fuels from Waste" in Kirk-Othmer: *Encyclopedia of Chemical Technology*, 3rd ed., Vol. 11, pp. 393–410, published in 1980; and B. R. Crocker et al, in "Incinerators" in *Kirk-Othmer: Encyclopedia of Chemical Technology*, 3rd ed., Vol. 13, pp. 182–206, published in 1981. Waste material includes, but is not limited to, military waste, ordnance waste, dairy products waste, pharmaceutical manufacturing waste, chemical process waste, chemical agents, chemical by-products, agricultural waste, combinations thereof and the like. In particular, the treatment and safe disposal of hazardous military waste has become a project of urgent importance because the scale of disposal has enlarged to proportions far beyond that of only a few years ago.

Current disposal practices most often used are combustion and incineration-based. However, despite significant advances in incineration technology, there is increasing public apprehension and resistance to its present and future use. See, for example, David J. Hanson, in *Chemical and Engineering News*, pp. 7–14, published Mar. 29, 1993.

Some art of interest is as follows:

D. V. Moses, et al. in U.S. Pat. No. 2,690,425 disclose a process for the disposal of industrial wastes of an organic nature by contact with a solid catalyst of manganese-zinc-chromium at a temperature of 100°–350° C. and a pressure of between 200 and 2400 psi.

C. M. Saul in U.S. Pat. No. 3,207,572 disclose a process for the wet combustion of waste liquors containing combustible organic materials. Oxygen or air is always present.

J. W. Monroe, et al. in U.S. Pat. No. 3,312,231 disclose an apparatus and method for the removal and reclamation of solid propellant rocket motor cases. No inorganic salt catalyst is used. Also refer to L. B. Scott in U.S. Pat. No. 3,440,096.

M. J. Mcintosh in U.S. Pat. No. 3,451,789 disclose a process for removing oxidizers from a solid propellant. The process involves the mechanical reduction of the propellant to small crystals followed by contact with leach water.

W. M. Fassell, et al. in U.S. Pat. No. 3,870,631 disclose an apparatus and method for oxidation of organic matter at elevated temperatures and pressures in the presence of oxygen. No salt catalyst is described.

C. A. Hoffman in U.S. Pat. No. 3,876,497 discloses a process for wet air oxidation where the organic materials present in paper mill sludges are converted into environmentally acceptable oxidation products.

J. E. Morgan in U.S. Pat. No. 3,920,506 discloses a process for the wet combustion of waste liquors at elevated temperature and elevated pressure in the presence of an oxygenating gas.

W. T. Nelson et al. in U.S. Pat. No. 4,000,068 disclose a process for the purification of organic compound containing polluted water using a water soluble copper salt catalyst in the presence of oxidizing conditions.

J. W. Mandoki in U.S. Pat. No. 4,005,762 discloses aqueous hydrolyses and depolymerization of condensation polymers at a temperature of between 200° and 300° C. and elevated pressure of at least 15 atmospheres.

J. Kreuter in U.S. Pat. No. 4,013,552 discloses a method of accelerating decomposition of liquid or solid sewage waste by irradiation using ultrasonic energy.

L. A. Pradt in U.S. Pat. No. 4,013,560 discloses a process for wet oxidation of aqueous liquors at elevated temperatures and elevated pressures in the presence of an oxidizing gas to produce mechanical power.

J. C. Hoffsommer, et al. in U.S. Pat. No. 4,018,676 disclose a process for the removal of explosive materials from water by chemical interaction using strongly basic ion exchange resins.

C. C. Andrews, et al. in U.S. Pat. No. 4,038,116 disclose a method for treating an aqueous solution of aromatic explosives. An additive such as acetone or hydrogen peroxide is added to an aqueous solution of organic aromatic explosives, which mixture is exposed to ultraviolet light.

R. Thiel et al. in U.S. Pat. No. 4,141,829 disclose a process for the oxidation of organic substances in an aqueous solution using molecular oxygen at elevated temperature and elevated pressures.

R. P. McCorquodale in U.S. Pat. No. 4,604,215 discloses a process for wet oxidizing an aqueous suspension of organic material at elevated temperature and pressure in the presence of specific inorganic catalysts.

K. Mitsui, et al., in U.S. Pat. No. 4,751,005 disclose the treatment of waste water by subjecting it to wet oxidation in the liquid phase in the presence of a catalyst containing a composite oxide of at least two metals selected from the group consisting of Ti, Si and Zn, and at least one metal selected from the group consisting of Mn, Fe, Co, Ni, W, Cu, Ce, Ag, Pt, Pd, Rh, Ru and In, or a compound of the one metal described above.

D. C. Sayles in U.S. Pat. No. 4,758,387 discloses a process for the decomposition of propellants using water and a detergent at elevated temperatures and pressures.

W. Gresser, et al. in U.S. Pat. No. 5,011,614 disclose a process for effecting thermal decomposition of explosive nitric acid esters in wastewater. In this process, the dissolved esters are exposed to a temperature of between 150° and 300° C. under pressure above the boiling point of the waste water.

The Zimpro process utilizes a wet air oxidation as described in product brochures obtained from Zimpro, Inc., Environmental Control Systems, Rothschild, Wis. 54474.

M. Roth in U.S. Pat. No. 4,231,822 discloses a non-polluting process for desensitizing explosives by contact with a reductant (e.g., oxalic acid, formic acid, glucose, etc.) at elevated temperature.

A. S. Tompa, et al. in U.S. Pat. No. 4,098,627 disclose the solvolytic degradation of pyrotechnic materials containing crosslinked polymers. The process uses a temperature of 50° to 160° C. in a liquid medium having an active hydrogen. No salt compounds as catalysts are disclosed.

M. Modell in U.S. Pat. No. 4,338,199 discloses the supercritical water oxidation (SCWO) of organic materials to obtain useful energy and/or resultant materials using a temperature of at least 377° C. and a pressure of at least 220° atmospheres. In this process, the water present is always in the gas phase above the critical temperature of water. Further, an additional oxidant (e.g. oxygen, etc.) is always present.

The Sterling Drug Co. in British Pat. No. 706,586 disclose a process using between 450° F. and the critical temperature of water, preferably between 480° and 625° F. at elevated pressure for the destructive oxidation of organic materials in aqueous media. No catalyst is present.

A. H. Lamberton, et al. in the *Journal of the Chemical Society* pp. 1650–1656 (1949) disclose the decomposition of nitramines in water at temperatures below 70° C. at pH ranges of 3 to 8 in the absence of added inorganic salts. Inorganic acid, inorganic base and formaldehyde were found to catalyze the decomposition.

J. C. Hoffsommer, et al. in the *Journal of Physical Chemistry*, Vol. 81 (#5), pp. 380–385 (1977) disclose the kinetic and activation parameters for aqueous alkaline homogeneous hydrolysis of 1,3,5-triaza-1,3,5-trinitrocyclohexane (RDX).

Also see U.S. Pat. Nos. 4,115,264, 4,499,062, and 5,057,220.

None of these references individually or separately teach or suggest the present invention.

All patents, patent applications, articles, references, publications, standards and the like cited in this application are incorporated herein by reference in their entirety.

There is therefore a strong need for alternative methods of decomposition and disposal of waste to the presently used incineration methods. What is needed is a process which circumvents combustion without adding any oxidant, without the need to introduce air, oxygen or other conventional oxidants, and without the need to introduce other promoters which are often themselves environmentally unsuitable. Further, the process should at the same time have the flexibility to handle a wide range of waste materials with high degrees of volume, reliability and safety. Further, control of the species in the overall product stream should be possible, in that the products can either be discharged directly to the environment or can be readily treated effectively and efficiently by conventional secondary waste treatment processes and facilities. The operational and commercial value of the present invention is that it provides a process to decompose waste material safely to environmentally acceptable products at milder conditions than are currently available. Further, it provides a framework for one to be able to control the rate of hydrothermal decomposition by judicious choice of salt(s), waste material, concentrations, temperature and pressure. That is to say, the hydrothermal decomposition is accelerated using the catalysts or promoting reagents to practical and economically useful rates, while at the same time the rate is safely controlled within conventional equipment so that it is not so fast as to be uncontrolled or hazardous. The present invention provides a process to accomplish these results.

SUMMARY OF THE INVENTION

The present invention provides a process for the hydrothermal decomposition of waste materials under controlled, safe and practical conditions. Specifically aqueous solutions or suspensions of silica or inorganic alkali metal silicate, borate, phosphate, biphosphate, trisubstituted-phosphate or combinations thereof are used as catalysts or inorganic alkali metal or alkaline earth metal nitrites are used as promoting reagents or combinations of catalysts and promoting reagents thereof. These inorganic catalysts or promoting reagents make it possible for rapid hydrothermal decomposition (to 99.9+%) of the waste at temperatures of between about 200° to 500° C. and pressures of between about 20 and 500 atmospheres within about 0.01 and 10 min wherein some water is present as a liquid.

More specifically, the present invention relates to a process for the disposal of waste or the conversion of hydrothermally lablie chemical groups and compounds to chemical species which are environmentally acceptable, or are amendable to further degradation by conventional disposal systems to produce environmentally acceptable products, which hydrothermal decomposition process comprises:

(a) conveying an aqueous solution or slurry of the waste material into a reaction zone capable of safely withstanding the temperatures and pressures of the hydrothermal decomposition;

(b) reacting the waste material in the reaction zone with an aqueous composition comprising silica or one or more alkali metal silicates, borates, phosphates, biphosphates, or trisubstituted-phosphates as catalyst or one or more alkali metal nitrites as promoting reagents, at between about 200° C. and 500° C. and at a pressure between about 20 and 500 atmospheres for between about 0.01 and 10 minutes;

(c) producing compounds which are environmentally acceptable or are amenable to further degradation by conventional disposal systems; and (d) optionally degrading further the compounds of step (c) by reaction in a conventional disposal system. Some water is always present as a liquid.

In one preferred embodiment the reaction zone in step (a) is capable of withstanding a temperature up to about 400° C. and pressures of up to about 400 atmospheres, and in step (b) the reaction temperature is between about 250° and 400° C. and the pressure is between about 100 and 300 atmospheres. Some water as a liquid is always present.

In another preferred embodiment the reaction temperature is between about 250° C. up to, but not at or above the critical temperature, and the pressure is between about 100 and 300 atmospheres. Some water as a liquid is always present in this preferred embodiment.

In another preferred method the hydrothermal decomposition occurs with nitrite in the essential absence of any added conventional promoter, conventional oxidizing material or conventional oxidizing catalyst.

In a preferred embodiment the hydrothermal decomposition occurs with the proviso that no oxidizing agent (or a catalyst such as metal ions, particularly transition metal ions, specifically zinc ions) is added to the reaction in step (b).

In another preferred embodiment, the time of hydrothermolytic decomposition is between about 0.1 and 5 minutes.

In another preferred embodiment, the reaction equipment of step (a) is capable of withstanding a reaction temperature in step (b) of between about 200° to 400° C. and a reaction pressure of between about 100 and 250 atmospheres.

In one preferred embodiment of the process, the waste material is independently selected from ordnance waste, dairy waste, pharmaceutical waste, chemical agents, chemical by-products waste, chemical and chemical processing waste, agricultural waste or combinations thereof.

More specifically, the preferred ordnance waste is selected from nitrate esters, nitramines and nitroarenes, and especially preferred is ordnance waste wherein the nitrate esters are selected from nitroglycerin, nitrate-containing binders or pentaerythritol tetranitrate, the nitramines are selected from cyclotrimethylenetrinitramine (RDX) or cyclotetramethylenetetranitramine (HMX) and the nitroarenes are selected from 2,4- or 2,6-dinitrotoluene, 2,4,6-trinitrotoluene (TNT) or picric acid.

One preferred embodiment of the process is to heat the reaction mixture just below the critical temperature, and the salt of the catalyst composition is independently selected from:

lithium silicate, sodium silicate, potassium silicate, rubidium silicate, cesium silicate, lithium borate, sodium borate, potassium borate, rubidium borate, cesium borate, lithium phosphate, sodium phosphate, potassium phosphate, rubidium phosphate, cesium phosphate, lithium biphosphate, potassium biphosphate, rubidium biphosphate, cesium biphosphate, trilithium phosphate, trisodium phosphate, tripotassium phosphate, trirubidium triphosphate, triceslum phosphate, or combinations thereof. More preferably, the salt is independently selected from sodium borate, potassium borate, sodium silicate, potassium silicate, trisodium phosphate, tripotassium phosphate or combinations thereof.

In another preferred embodiment of the process, the reaction mixture is heated to 200° C. or just below the critical temperature, and the salt of the promoting composition is independently selected from alkali metal nitrites, alkaline earth metal nitrites or combinations thereof selected from: sodium nitrite, potassium nitrite, calcium nitrite, magnesium nitrite, lithium nitrite, rubidium nitrite, cesium nitrite, francium nitrite or combinations thereof. More preferably, the salt is independently selected from sodium nitrite, potassium nitrite or combinations thereof.

In still another preferred embodiment, the temperature of the hydrothermal decomposition reaction in step (b) is between about 300° and 373° C.

A preferred embodiment is a process wherein:
the waste material is selected from ordnance, ordnance waste or ordnance formation waste water; and
in step (b) the reaction temperature is between about 200° and 373° C. and below the critical temperature of water, and the reaction time is between 0.01 and 5 minutes and, the salts are present in the aqueous composition in a concentration of between about 1 and 40 percent by weight of the salt/water present. More preferably, the inorganic salts are independently selected from sodium borate, potassium borate, sodium silicate, potassium silicate or combinations thereof.

BRIEF DESCRIPTION OF THE FIGURES

FIG. 1A is a graphic representation of the Arrhenius plot for the hydrothermal decomposition of TNT in liquid water and added sodium tetraborate at 200° C.

FIG. 1B is a graphic representation of the Arrhenius plot for the hydrothermal decomposition for nitroglycerin (NG) in liquid water and added sodium tetraborate at 200° C.

FIG. 2 is a graphic representation of the first order rate constants for the decomposition of trinitrotoluene (TNT) in water containing mM quantities of dissolved sodium salts: silicate, borate and phosphate.

FIG. 3 is a graphic representation of the effects of pH on the hydrothermolytic decomposition of TNT for solutions at different temperatures and times.

FIG. 4 is a graphic representation for the hydrothermolytic decomposition of TNT and other materials at 200° C. in liquid water versus the pH of the starting solution.

FIG. 5 is a graphic representation of the time to explosion and kinetics of hydrothermolysis for TNT constructed using the present data and some literature sources. The conditions for wet air oxidation and supercritical water oxidation are noted.

FIG. 6 is a graphic representation of the fraction of the starting carbon and nitrogen quantities present in the recovered solids from the hydrothermolysis of TNT.

FIG. 7 is a schematic representation of one embodiment of the process of hydrothermal decomposition of waste material.

FIG. 8 is a schematic representation of another embodiment of the process of hydrothermal decomposition of waste material. The process heat is also used to turn a turbine.

FIG. 9 is a graphic representation of the decomposition of a 1 weight percent TNT at 300° C. using sodium nitrite with a molar ratio of nitrite to TNT being 10 to 1. The percent of remaining TNT versus time in minutes is shown wherein the circles represent TNT alone and squares represent TNT with a promoter.

DETAILED DESCRIPTION OF THE INVENTION AND PREFERRED EMBODIMENTS

Definitions

As used herein: "ADN" refers to ammonium dinitramide. "Catalyst composition" refers to silica or to salt compounds independently selected from lithium silicate, sodium silicate, potassium silicate, rubidium silicate, cesium silicate, lithium borate, sodium borate, potassium borate, rubidium borate, cesium borate, lithium phosphate, sodium phosphate, potassium phosphate, rubidium phosphate, cesium phosphate, lithium biphosphate, potassium biphosphate, rubidium biphosphate, cesium biphosphate, trilithium phosphate, trisodium phosphate, tripotassium phosphate, trirubidium triphosphate, triceslum phosphate, or combinations thereof. Preferably, the salt is independently selected from sodium borate, potassium borate, sodium silicate, potassium silicate, sodium phosphate, potassium phosphate or combinations thereof. Inorganic borates or silicates are more preferred, and the sodium or potassium salts are especially preferred.

"Conventional oxidizing agents" refers to agents such as oxygen, ozone, hydrogen peroxide, nitrate and the like. These agents are usually excluded as promoters in the present invention.

"Promoting reagent" refers to salt compounds which are independently selected from sodium nitrite, potassium nitrite, calcium nitrite, magnesium nitrite, lithium nitrite, rubidium nitrite, cesium nitrite, francium nitrite or combinations thereof which participate in the reaction and undergo a chemical change thereby.

"CL-20" refers to a caged organic nitramine, the exact structure of which is still classified by the U.S. Department of Defense. Its hydrothermal decomposition is similar to that of HMX.

"HMX" refers to 1,3,5,7-tetranitro-1,3,5,7-tetraazacyclooctane or to cyclotetramethylenetetranitramine.

"DNT" refers to 2,4- or 2,6-dinitrotoluene or combinations thereof.

"NG" refers to nitroglycerin.

"Nitroalkanes" refers to the C1 to C12 mono or poly nitro substituted alkanes. These compounds may be present in a waste stream, as a product, as by-products, as unreacted materials, or as trace contaminants. Nitromethane is a preferred nitroalkane.

"Nitrogen-containing inorganic salt" refers preferably to ammonium dinitramide (ADN), $NH_4^+N(NO_2)_2^-$.

"Ordnance waste" refers to energetic materials, binder propellants, nitroalkanes and the like as used in missiles, rockets, bombs, shells and the like. Some representative materials are shown below.

"RDX" refers to 1,3,5-trinitro-1,3,5-triazacyclohexane or to cyclotrimethylenetrinitramine.

"Sodium silicate" refers to structures varying from $Na_2O$-$3.75SiO_2$ to $2Na_2O$—$SiO_2$ and also various portions of water. Usually the structure is $Na_2SiO_3$ having a formula weight of 122.08

"Sodium tetraborate" refers to the compound of formula $Na_2B_4O_7.10$ HOH having a formula weight of 381.37. It is also known as sodium borate, sodium pyroborate or borax.

"Amenable to further degradation" refers to a waste which is first subjected to hydrothermal decomposition producing a decomposition product. This product of the hydrothermal decomposition may be in a form and at a level to be acceptably conveyed to the environment, or the product needs to be further subjected (and is amenable to) to a secondary treatment, decomposition or conversion process, such as biodegradation in a sewage treatment plant, to produce an ultimate converted product which is environmentally acceptable.

"Hydrothermally labile compounds or substances" refers to those materials which decompose under conditions of heat and liquid water. Preferably, a heteroatom such as O, N, S, P, halogen, etc. is present which is labile (undergoes bond breakage) under the hydrothermal reaction conditions described herein.

"Trisodium phosphate" refers to a structure represented as $Na_3PO_4.12HOH$ having a formula weight of 380.12. It is also known as tribasic sodium phosphate, TSP, and trisodium orthophosphate.

"TNT" refers to 2,4,6-trinitrotoluene.

"Environmentally acceptable levels" refers to the concentrations of a chemical which are permitted to be discharged to the environment, as a solid, liquid or gas. These levels for chemicals such as nitroglycerin, TNT, DNT, HMX, RDX, AP, $NO_x$, $SO_x$, halogen, dioxin and the like are established by the Environmental Regulation Agency for each country. For instance in the U.S., these discharge levels are established by the U.S. Environmental Protection Agency (EPA). The EPA has established environmentally acceptable levels of pollutants such as biological oxygen demand (BOD), total oxygen demand (TOD), NO, $NO_x$, $SO_2$, $SO_3$, HCl, HBr, $H_2S$, dioxin, etc. which are easily be obtained from government sources. Usually these levels are defined and described at the parts per million (to billion) level.

"Waste" refers to any of those materials which are regulated by U.S., foreign or state governmental agencies concerning the concentrations (amounts or levels) which are permitted to be discharged to the ambient (public) environment. Dairy waste includes for example, washings from dairy product processing equipment, whey solutions, whey wash solutions concentrated whey solutions and the like. Military waste includes for example, aged or obsolete shells, ordnance and the like. Ordnance waste included aged or obsolete bombs, shells, explosives, propellants or the solutions used in their manufacture. Any aqueous solution waste may be concentrated prior to hydrothermal decomposition.

As is described above the available methods of decomposition of waste organic and inorganic materials have significant problems. The improved process of the present invention encompasses a broad range of catalysts, promoting reagents, temperatures, pressures, concentrations and the like. Further, this improved process needs no added oxidizing material and no transition metal ions present.

Some more specific combinations are listed below and are subsequently discussed in more detail.

The present invention concerns hydrothermal decomposition without the addition of oxidant, and is not an oxidation of the labile compounds at elevated temperature. The following catalyst or promoting reagent conditions are at temperatures up to but not including the critical temperature of water. Thus, some water as a liquid is always present for:

1. Dilute solutions of inorganic catalyst,
2. Intermediate concentrations of inorganic catalyst,
3. High concentrations of inorganic catalyst, and
4. Stoichiometric Amounts of Promoting Reagent.

All Conditions are Below the Critical Temperature of Water (200° to 373° C.; 20 to 300 atm)

The combination of thermal, pressure, and time requirements of the present catalyzed or promoted processes are surprisingly lower than those reported for conventional art processes. Decomposition of the waste material under the reaction conditions of the present invention, e.g., ordnance waste, generally proceeds very quickly. The residence times are very brief so that even with a residence time of up to about 10 min, or about 1-2 min or less, complete degradation of the waste occurs. Further, residence times of the waste in this lowered temperature range translate into modestly sized plants which can have very high rates of contaminated feed using conventional process equipment and subsequent degradation, when necessary, using conventional biodegradation processes. In contrast, wet air oxidation (e.g., the Zimpro process) typically requires residence in tens of min, and supercritical water oxidation (SCWO) requires higher temperatures and pressures and often an oxidizing catalyst.

1. Dilute Concentrations of Catalyst

Referring now to the Figures, FIG. 1A is a conventional Arrhenius plot for the decomposition of TNT in neutral water from about 200° to 260° C. The straight line 11 is extrapolated to higher temperatures. Surprisingly, when catalytic amounts of sodium tetraborate are added, it is seen that the reaction rate increases significantly, region 12. Region 13 defines the favorable region of temperature and half lives of reaction for TNT. As can be seen in FIG. 1A, the sodium tetraborate as a catalyst moves the hydrothermal decomposition of TNT into the favorable region (overlap of region 12 and 13) for more moderate reaction conditions, resulting in 99.99+% decomposition.

FIG. 1B is a graphic representation of the Arrhenius plot for the hydrothermal decomposition of nitroglycerin (NG) in liquid water and added tetraborate at 200° C. The data for the base catalyzed hydrolysis is of Capellos et el., *Int. J. Chem. Kinet*, Vol. 16, pp. 1027–1051 (1984) are shown as part 14A of line 14, wherein the points are adjusted to neutral. The results of this research adjusted to neutral are shown as part 14B of line 14. Line 15 represents the results of this research performed at neutral, and reflects the onset of an even faster reaction for hydrothermal decomposition. Surprisingly, when catalytic amounts of sodium silicate are added, it is seen that the reaction rate for NG increases significantly, region, 16. The overlapping region of region 16 and region 17 defines the favorable region of moderate temperature and half lives for controlled hydrothermal decomposition of NG of the present invention, to 99.9+percent decomposition or greater, preferably to 99.99+percent decomposition, more preferably to 99.999+percent decomposition.

In FIG. 2, catalysis of the hydrothermolysis of energetic materials by added salts is demonstrated by studies with TNT. The data for TNT, which has displayed the greatest resistance to hydrothermal degradation, are presented. Decomposition kinetics were studied in liquid water at 200° C. with the addition of millimolar quantities of $Na_2B_4O_7$, $Na_2SiO_3$, and $Na_3PO_4$. The results in FIG. 2 demonstrate that the kinetic effects are similar for the three salts, with an apparent first-order dependence on salt concentration (line 21), and apply similarly to nitrate esters, nitramines, and to other functionalized organic molecules. Line 22 represents the kinetics of the hydrothermal decomposition with no added salt.

Since some of the salts can generate basic solutions with high pH values (in the case of trisodium phosphate up to almost pH 11), additional studies were conducted with added KOH so that effects of basicity and salt addition could be separated.

As shown in FIG. 3, when pH is considered; however, there is a considerable difference in the net effects. Water alone and added KOH are shown as composite straight line 31. The potassium hydroxide data show a modest promotion of the decomposition by base (slope=0.24, $R^2$=0.86). However, it is clear that sodium tetraborate (line 32), and to a lesser extent silicate (line 33), promote and catalyze the hydrothermal decomposition substantially beyond that seen for the base-promoted reaction. This is a surprising and completely unexpected result based on known salt effects. Thus at pH 9, 1.0 mM tetraborate ($1.3 \times 10^{-2}$ weight percent) increases the rate of reaction by 1 order of magnitude.

FIG. 4 shows that the data points fall for six different energetic compounds in a surprisingly narrow band. Some results for spontaneous (uncatalyzed) decomposition of TNT, NG, HMX and RDX in neutral water (pH=7) are shown in FIG. 4, also this figure is an Arrhenius plot showing half lives (i.e., periods of decomposition of half of the remaining waste material) as a function of temperature. The decomposition rates are rapid at temperatures up to about 300° C. (at autogenous pressure of 83 atm).

Useful conclusions are drawn from these figures:

The rapid rates of hydrothermal decomposition are due to salt effects.

Rapid rates for TNT using borate moves the half life of the reaction into the ≦10 sec region.

More importantly, as shown in FIG. 4, with the addition of catalytic quantities of the inorganic compounds or salts of the present invention, the region of the hydrothermal decomposition rates suggested by line 52 drop well into the useful region 53. Region 53 defines and describes the operationally preferred hydrothermal decomposition region of seconds or tens of seconds at reasonable temperatures (and pressures). Ten to 15 half lives are equivalent to high levels of thermo-hydrolytic decomposition (e.g., 99.9+, to 99.99+, to 99.999+% decomposition). Thus, a process with a half life of about 10 sec and residence times of less than 170 sec would provide an improved level of decomposition of 99.999+%.

While not wanting to be bound by theory, it appears that the density of water stays liquid-like (density=0.35 g/ml) up to the supercritical temperature (about 374° C.). However, within this temperature region the viscosity of the liquid water falls rapidly to very low values as the temperature is increased. The dielectric constant also declines smoothly in the near critical temperature range to values comparable to polar organic liquids. The surprising result as demonstrated by the present invention is a fluid medium having a solvent capacity as a liquid, a capacity for dissolving both ionic salts and organic compounds, and viscosity and diffusivity comparable to a gas.

FIG. 5 shows the time to explosion and kinetics of hydrothermolysis data for TNT, and is created using some of the present data and some published data.

Hydrothermolysis of the present invention is shown by line 41 created by the solid boxes-■.

The time to explosion data creating line 47 are from R. Rogers, "Incompatibility in Explosive Mixtures." *I&EC Product Research and Development*, Vol. 1, pp. 169–172 (1962) and shown as open boxes □–42;

The thermal decomposition of TNT is found in R. McQuire, et al., "Chemical Decomposition Models for the Thermal Explosion of Confined HMX, TATB, RDX and TNT Explosives", which is shown as open circle -O. *Proceedings Seventh Symposium (International) on Detonation*. Naval Surface Weapons Center, MP 82–334, 56–64 (1981). Also see J. Dacons et al., *J. Physical Chemistry*, Vol. 74, 3035–3040 (1970) which are shown as open triangles Δ–44.

The wet air oxidation data are from W. M. Copa et al., "Wet Air Oxidation of Propellants and Propellant Wastewater." Paper presented at the JANNAF Workshop, Tyndall AFB, Mar. 27–28 (1990), and the data are shown as a box region 45.

The supercritical water oxidation (SCWO) data are from an open seminar at SRI International by J. Robinson, "Hydrothermal Processing of Hazardous Waste." Presentation by Los Alamos National Laboratory (LANL) studies in supercritical water oxidation and related activities, Dec. 19, 1992, and is shown as a box region 46.

Irregular region 47 of FIG. 5 defines the temperature, pressure and time conditions wherein autoignition will occur when these parameters are present.

Note that both the wet oxidation process, region 45, and supercritical water oxidation process (SCWO), region 46, of the conventional decomposition art are both found in this hazardous autoignition region. Thus, there is always a danger using these processes.

On the other hand, irregular region 48 defines the temperature and time conditions of the present invention wherein only catalyzed hydrothermolytic decomposition will occur.

FIG. 6 is a graphic representation of the fraction of the carbon and nitrogen quantities present in the recovered solids from the hydrothermal decomposition of TNT. The temperature (°C.) and time (min) is shown on the x-axis. As can be seen most of the carbon and nitrogen remain for the experiments wherein there is no added inorganic salt. However, for similar experiments (at lower temperatures and time conditions), in the presence of the salts of the present invention, significantly lower fractions of carbon and nitrogen.

As shown in FIG. 6, a bulk TNT reaction is run having very high levels of salts. TNT is present at levels well above its room temperature solubility limits in water thus there was solid TNT present at the start of an experiment. Since TNT melts at 80° C., it, of course, is molten at that temperature. The salts themselves were partially insoluble. Both salt and control (salt-free) runs were performed, and a dark solid was recovered from all runs. In the control runs, the solid residue was an unidentified organic product, but in the added salt runs the solids were essentially only the added salt. These results are shown in FIG. 6 which shows the fraction of the starting C and N quantities which were present in the recovered solids after the hydrothermolysis of TNT the residue were virtually the solid portion of the starting salts.

Borate ion in this case appears to be the most effective salt, with the recovered carbon and nitrogen on the product solid well below 10% of the starting quantities. Analyses of the recovered aqueous fractions have not accounted for the missing carbon or nitrogen, although formate, glycolate and nitrate were identified. It is expected that most of the missing material is in the gas phase as $N_2$, $N_2O$, CO and $CO_2$.

The present invention may occur in a batch process by combining the waste, water and catalyst in a pressure vessel, heating the vessel to the desired temperature for the time desired, cooling to ambient conditions and discharging the acceptable compounds to the environment or optionally to any conventional system for the destruction of the waste compounds to environmentally acceptable products. A continuation process is also contemplated. The temperature and nature of the waste determine the ultimate autogenic pressure.

An embodiment of a continuous process of the present invention is shown in FIG. 7. Water enters the stirred dissolving tank 61 via line 63 and catalyst or promoting reagent is added via line 62. After mixing, the solution or slurry is conveyed via line 64 through eductor 65 and exits via line 66. The waste material as a solution or a slurry is retained in container 70. The waste solution or slurry is conveyed via line 71 to pump 72 and exits via line 73. The waste stream and catalyst or reagent stream combine at T-joint 66A and are conveyed to heat exchanger 74. For the stream exiting in line 75, two options are available. The aqueous mixture passes through valve 76 into line 77 into the preheater 78, exit in a heated state through line 79, pass through valve 80 and line 81 into line 87. Alternatively, the combined aqueous mixture enters line 85 pass through value 86 and exits in line 87. The waste mixture (heated or unheated) in line 87 enters the heated reactor 82 and passes through at predetermined time, temperature and pressure conditions to obtain the level of hydrothermal decomposition desired. A drain valve 83 to remove samples is shown. The hot hydrothermally decomposed waste stream is conveyed through line 84 into heat exchanger 74 and exits in line 88 into cooling chamber 89 to reduce the temperature to about ambient. The waste solution or slurry is next conveyed via line 90 through valve 91 and line 92 into flash drum 93. The liquid (or slurry) is conveyed through line 94, into pump 95, through line 96 and to stationary screen 97 to remove solids. These solids may be discharged to the environment. The aqueous portion is conveyed via line 98 to pump 99 and is transported via line 100 to any one of many conventional treatment systems 101, preferably biological. The system shown in FIG. 7 as system 101 is a conventional aerated biotreatment system. The water portions are then combined and conveyed via line 102 to holding tank 103. Finally, the liquid is conveyed via line 104 to pump 105 and then discharged to the environment via line 106.

A simplified continuous process can be constructed using specific components described in FIG. 8. That is to say, waste feed is directly connected to reactor 119 by line 112, the make up water is connected to reactor 119 via line 113, and catalyst or promoting reagent (in liquid or solid form) in vessel 120 is connected to reactor 119 via line 121. Reactor 119 is constructed of materials to withstand the reaction conditions. The product of the thermolysis exits the reactor via line 124 to the acceptable reaction products 126 which are discharged to the environment. Alternatively, when the degraded waste products 126 are not yet environmentally acceptable, they can be conveyed via line 133 to a conventional degradation system, such as a biological sewage treatment plant 134, and the acceptable products are then conveyed to the environment.

One of ordinary skill in the art having this specification can construct an equipment system to perform the hydrothermal decomposition as described.

Another example illustrates the present invention is similar to that described by M. Modell in U.S. Pat. No. 4,338,199, using the system shown in FIG. 8. There are, however, significant differences. Modell uses oxidizing catalysts for the oxidation reactions, and all disclosure is for supercritical water (SCW), i.e. gaseous conditions.

The feed material of this invention includes, but is not limited to the waste material described herein above and enters the reaction system via line 112 to feed tank 111. Make up water (and optionally inorganic catalyst or promoting reagent) as needed is added via line 113. This reaction mixture in the feed tank is mixed such that the waste is present at a concentration of between about 0.01 to 20 percent by weight of the waste-water-catalyst or waste-water-reagent present. The catalyst present in one embodiment is between about 5 and 15 percent by weight of the 20 waste material present.

The reaction mixture is conveyed through line 114 to the feed pump 115 and then through line 116. The eductor 117 assists in the preheating of the feed as a portion of the superheated water is recycled using lines 124, 127 and 131 from the hot reactor 119 (aka reaction vessel 119). This configuration may provide for sufficient heating of the aqueous feed to bring the reactor 119 effluent to near supercritical conditions.

The heating is also accomplished by conveying the reaction mixture through line 117A (through optional reformer 117B for hydrocarbon waste), line 118 and line 118A.

The catalyst or promoting reagent may be added in line 113, or alternatively, the catalyst or reagent, as an aqueous solution or as an aqueous slurry, is stored in vessel 120, conveyed via line 121 to a pump or compressor 122. Water as needed is added by line 121A. The catalyst or promoting reagent is pumped under pressure through line 123 to mix at line 118A prior to entering reactor 119. Reactor 119 is fabricated of known alloys sufficient to safely contain pressures up to 500 atmospheres and temperatures of 500° C.

The mixture of reactants (waste, water, and inorganic catalyst or reagent) is fed to reactor 119, which can be of any suitable form, such as a tubular reactor or a fluidized bed. Generally low length-to-diameter (L-D) ratios in the fluidized bed are desired wherein the inorganic catalyst or promoting reagent content is high so as to minimize the reactor surface area and minimize and deposition of reactants or products on the interior walls of reactor 119. Reactor 119 is heated or operates such that the controlled heat released by hydrothermal decomposition of the waste may be sufficient to raise the fluid phase to temperatures in the operative temperature ranges of the process.

The remainder of the superheated water is optionally available for power generation, heating or other uses for high pressure steam (i.e. via line 127A to the expander turbine 128 through line 128A as high pressure steam and environmentally acceptable gaseous reaction products to the environment 130.

The effluent from the reactor 119 is transported using line 124 to separator 125 where optionally insoluble materials are removed via line 132 as reaction products. These reaction products 126 are already environmentally acceptable and are discharged or are now reaction products which now amendable to further degradation by transfer using line 133 to a disposal system 134 (i.e. conventional biological sewage system) for ultimate acceptable discharge via line 135 to the environment 136.

The first reaction kinetics of the present invention will usually occur and be independent of concentration of waste. Preferred ratios of waste, catalyst or promoting reagent and water are provided below.

2. Intermediate Concentrations of Catalyst

In this embodiment, the concentrations of the catalyst present are between about 1.51 and 9.99 percent by weight of the catalyst-water combination. Under these intermediate concentration levels of catalyst, the hydrothermolytic decomposition of waste is accelerated as expected based on the amount of catalyst and waste present. Water as a liquid is always present. The preferred temperatures are from about 200° to 373° C.

The waste is present in between about 1 and 20 percent by weight of the waste-catalyst-water combination.

With minor modifications, the processes described above for FIGS. 7 or 8, are applicable for these levels of catalyst concentrations.

3. High Concentrations of Catalyst

In this embodiment the concentration of catalyst present is between about 10.0 and 40 percent by weight of the catalyst-water combination. Under these levels of catalyst, the hydrothermolytic decomposition of waste is accelerated as would be expected based on the amount of catalyst and waste percent. Water as a liquid is always present, the useful temperatures are from about 200° to 400° C.

The waste is present in between about 1 and 20 percent by weight of the waste-catalyst-water combination.

With minor modifications, the process described above for FIGS. 7 or 8, is applicable for these levels of catalyst and concentrations.

It is to be understood that the concentrations of the solutes (catalysts) in the present invention for the concentration levels identified immediately above as paragraphs 1, 2, 3 may elevate the critical temperature values for water. For example, some highly concentrated sodium chloride aqueous solutions have a critical temperature above 700° C. The same type of increase in critical temperature is contemplated to be observed with catalysts of the present invention.

4. Stoichiometric Amount of Promoting Reagent

In this embodiment, the concentration of promoting reagent is selected from alkali metal nitrite or alkaline earth metal nitrite in any convenient molar ratio of nitrite to waste, depending on the type of reagent and waste used. For example when the process includes sodium nitrite as the reagent and TNT as the waste, the molar ratio of nitrite to TNT is about 20 to 1 or greater, preferably about 10 to 1, more preferably about 5 to 1, and most preferably about 3 to 1. As is described in the examples below when the catalyst for Examples 1–11 is replaced with a promoter, the desired decomposition occurs.

Overall, the present invention provides significantly lower cost processes for acceptable waste disposal to the environment.

Significant differences over the conventional art processes are as follows:

a. The rates of hydrolysis of nitrate esters, e.g., nitroglycerin, pentaerythritol tetranitrate) or nitramines (e.g., RDX, HMX, CL-20) in neutral water were very high. The rates of hydrolysis were much higher than oxidation at similar conditions to produce moieties degraded to levels beyond those of simple hydrolysis.

b. Nitroarenes (e.g., TNT, DNT) which have no obvious hydrolytic degradation route were unexpectedly unstable in neutral water at hydrothermal conditions reflecting the potential broad applicability of this innovation.

c. The addition of simple water soluble non-polluting salts at the parts per million (ppm) level provided substantial hydrothermal catalysis for nitrate esters, nitramines, nitroarenes and other materials.

d. More specifically, with the use of the present process, nitric acid esters, nitramides, nitroarenes and a wide range of other materials dissolved in water are decomposed quantitatively into many organic fragments (e.g., oxidation products of the alcohol derived from the ester, including $CO_2$) which are not generally toxic and which can be degraded in a conventional manner, e.g., a biological sewage treatment facility.

The practical benefits of this catalysis are demonstrated in FIGS. 1A and 4. These figures present Arrhenius plots for the decomposition of TNT in neutral water over the range 200°–260° C. With a goal of disposal system with characteristic times in seconds or less, it appears that temperatures above 350° C. would be necessary. However, if the catalytic effectiveness of tetraborate is reasonably constant at temperatures above 200° C., then it is seen that the use of a 1.0 mM solution of the salt lowers the temperature necessary for single-digit half lives to about 300° C. This action in turn lowers the accompanying pressures from greater than about 200 atm to about 80–85 atm, and clearly larger quantities of added salt reduce the effective reaction conditions even more.

The benefits of the use of promoting reagents are demonstrated as being significant in the decomposition of waste materials which are known to be especially difficult to degrade, such as aryl nitro compounds, e.g. TNT.

The saturated vapor pressure of water is the autogenous vapor pressure at a particular temperature. Table A below is taken from page D-149 of The CRC *Handbook of Chemistry and Physics*, 52nd ed., published in 1971 by the Chemical Rubber Company of Cleveland, Ohio 44128. This means, for example, that at a temperature of 350° C., the autogenous pressure is 2397.799 psi=218 atm. Of course, the actual reaction pressure at any temperature can be higher at any temperature using external pressure equipment of the art. The hydrothermal decomposition of the present invention occurs at each of the temperatures up to 373° C. as listed in Table A, preferably above 200° C., more preferably above 250° C., especially preferred is above 300° C.

It is well established that the critical temperature of water is 374° C. at a pressure of 217.7 atmospheres. The conversion ratios for various conventions for pressure are 1 atmosphere (atm)=14.695 pounds per square inch (psi)=1.013 bar=1.013×10$^5$ pascal (Pa)=760 torr.

TABLE A

SATURATED VAPOR PRESSURE OF WATER

| Temp. °C. | mm | Pounds per sq. in. |
|---|---|---|
| 170 | 5940.92 | 114.879 |
| 171 | 6085.32 | 117.671 |
| 172 | 6233.52 | 120.537 |
| 173 | 6383.24 | 123.432 |
| 174 | 6538.28 | 126.430 |
| 175 | 6894.08 | 129.442 |
| 176 | 6852.92 | 132.514 |
| 177 | 7015.56 | 135.659 |
| 178 | 7180.45 | 138.848 |
| 179 | 7349.20 | 142.110 |
| 180 | 7520.20 | 145.417 |
| 181 | 7694.24 | 148.782 |
| 182 | 7872.08 | 152.221 |
| 183 | 8052.96 | 155.719 |
| 184 | 8236.88 | 159.275 |
| 185 | 8423.84 | 162.890 |
| 186 | 6616.12 | 166.609 |
| 187 | 8809.92 | 170.356 |
| 188 | 9007.52 | 174.177 |
| 189 | 9208.16 | 178.057 |
| 190 | 9413.36 | 182.025 |
| 191 | 9620.08 | 186.022 |
| 192 | 9831.36 | 190.107 |
| 193 | 10047.20 | 194.281 |
| 194 | 10265.32 | 198.499 |
| 195 | 10488.76 | 202.818 |
| 196 | 10715.24 | 207.199 |
| 197 | 10944.75 | 211.637 |
| 198 | 11179.60 | 216.178 |
| 199 | 11417.48 | 220.778 |
| 200 | 11659.16 | 225.451 |
| 201 | 11905.40 | 230.213 |
| 202 | 12155.44 | 235.048 |
| 203 | 12408.52 | 239.942 |
| 204 | 12666.15 | 244.924 |
| 205 | 12929.12 | 250.008 |
| 206 | 13197.40 | 255.196 |
| 207 | 13467.96 | 260.428 |
| 208 | 13742.32 | 265.733 |
| 209 | 14022.76 | 271.156 |
| 210 | 14305.48 | 276.623 |
| 211 | 14595.04 | 282.222 |
| 212 | 14888.40 | 287.895 |
| 213 | 15184.80 | 293.625 |
| 214 | 15488.04 | 299.490 |
| 215 | 15792.80 | 305.383 |
| 216 | 16104.40 | 311.408 |
| 217 | 16420.56 | 317.522 |
| 218 | 16742.04 | 323.738 |
| 219 | 17067.32 | 330.028 |
| 220 | 17395.64 | 336.377 |
| 221 | 17731.56 | 342.872 |
| 222 | 18072.80 | 349.471 |
| 223 | 18417.84 | 356.143 |
| 224 | 18766.68 | 362.888 |
| 225 | 19123.12 | 369.781 |
| 226 | 19482.60 | 376.732 |
| 227 | 19848.92 | 383.815 |
| 228 | 20219.80 | 390.987 |
| 229 | 20596.76 | 398.276 |
| 230 | 20978.28 | 405.654 |
| 231 | 21365.12 | 413.134 |
| 232 | 21757.28 | 420.717 |
| 233 | 22154.00 | 428.388 |
| 234 | 22558.32 | 436.207 |
| 235 | 22967.98 | 444.128 |
| 236 | 23382.92 | 452.152 |
| 237 | 23802.44 | 460.254 |
| 238 | 24229.56 | 468.523 |
| 239 | 24661.24 | 476.871 |
| 240 | 25100.52 | 485.365 |
| 241 | 25543.60 | 493.933 |
| 242 | 25994.28 | 502.647 |
| 243 | 26449.52 | 511.450 |

TABLE A-continued

SATURATED VAPOR PRESSURE OF WATER

| Temp. °C. | mm | Pounds per sq. in. |
|---|---|---|
| 244 | 26912.36 | 520.400 |
| 245 | 27381.28 | 529.467 |
| 246 | 27855.52 | 538.638 |
| 247 | 28335.84 | 547.925 |
| 248 | 28823.76 | 557.360 |
| 249 | 29317.00 | 566.898 |
| 250 | 29817.84 | 576.583 |
| 251 | 30324.00 | 586.370 |
| 252 | 30837.75 | 596.305 |
| 253 | 31356.84 | 606.342 |
| 254 | 31885.04 | 616.556 |
| 255 | 32417.80 | 626.858 |
| 256 | 32957.40 | 637.292 |
| 257 | 33505.36 | 647.888 |
| 258 | 34059.40 | 658.601 |
| 259 | 34618.76 | 669.417 |
| 260 | 35188.00 | 680.425 |
| 261 | 35761.80 | 691.520 |
| 262 | 36343.20 | 702.763 |
| 263 | 36932.20 | 714.152 |
| 264 | 37529.56 | 725.703 |
| 265 | 38133.00 | 737.372 |
| 266 | 38742.52 | 749.158 |
| 267 | 39361.92 | 761.135 |
| 268 | 39986.64 | 773.215 |
| 269 | 40619.72 | 785.457 |
| 270 | 41251.15 | 797.861 |
| 271 | 41910.20 | 810.411 |
| 272 | 42566.08 | 823.094 |
| 273 | 43229.56 | 835.923 |
| 274 | 43902.15 | 848.929 |
| 275 | 44560.84 | 862.053 |
| 276 | 45269.40 | 875.367 |
| 277 | 45964.04 | 888.799 |
| 278 | 46669.32 | 902.437 |
| 279 | 47382.20 | 915.222 |
| 280 | 48104.20 | 930.183 |
| 281 | 48833.80 | 944.291 |
| 282 | 49570.24 | 958.532 |
| 283 | 50316.56 | 972.983 |
| 284 | 51072.76 | 987.586 |
| 285 | 51838.08 | 1002.385 |
| 286 | 52611.76 | 1017.345 |
| 287 | 53395.32 | 1032.497 |
| 288 | 54187.24 | 1047.810 |
| 289 | 54989.04 | 1063.314 |
| 290 | 55799.20 | 1078.980 |
| 291 | 56612.40 | 1094.705 |
| 292 | 57448.40 | 1110.871 |
| 293 | 58284.40 | 1127.035 |
| 294 | 59135.60 | 1143.496 |
| 295 | 59994.40 | 1160.102 |
| 296 | 60860.60 | 1176.836 |
| 297 | 61742.40 | 1193.903 |
| 298 | 62624.00 | 1210.950 |
| 299 | 63528.40 | 1228.439 |
| 300 | 64432.80 | 1245.927 |
| 301 | 65352.40 | 1263.709 |
| 302 | 66279.60 | 1281.638 |
| 303 | 67214.40 | 1299.714 |
| 304 | 68156.80 | 1317.937 |
| 305 | 69114.40 | 1336.454 |
| 306 | 70072.00 | 1354.971 |
| 307 | 71052.40 | 1373.929 |
| 308 | 72048.00 | 1393.181 |
| 309 | 73028.40 | 1412.139 |
| 310 | 74024.00 | 1431.390 |
| 311 | 75042.40 | 1451.083 |
| 312 | 76076.00 | 1471.070 |
| 313 | 77117.20 | 1491.203 |
| 314 | 78166.00 | 1511.484 |
| 315 | 79230.00 | 1532.058 |
| 316 | 80294.00 | 1552.632 |
| 317 | 81373.20 | 1573.501 |

TABLE A-continued

SATURATED VAPOR PRESSURE OF WATER

| Temp. °C. | mm | Pounds per sq. in. |
|---|---|---|
| 318 | 82467.60 | 1594.663 |
| 319 | 83569.60 | 1615.972 |
| 320 | 84686.80 | 1637.575 |
| 321 | 85689.20 | 1659.472 |
| 322 | 86959.20 | 1681.516 |
| 323 | 88114.40 | 1703.854 |
| 324 | 89277.20 | 1726.339 |
| 325 | 90447.60 | 1748.971 |
| 326 | 91633.20 | 1771.897 |
| 327 | 92826.40 | 1794.969 |
| 328 | 94042.40 | 1818.483 |
| 329 | 95273.60 | 1842.291 |
| 330 | 96512.40 | 1866.245 |
| 331 | 97758.80 | 1890.346 |
| 332 | 99020.40 | 1914.742 |
| 333 | 100297.20 | 1939.431 |
| 334 | 101581.60 | 1964.267 |
| 335 | 102881.20 | 1989.398 |
| 336 | 104196.00 | 2014.622 |
| 337 | 105526.00 | 2040.540 |
| 338 | 106871.20 | 2066.552 |
| 339 | 108224.00 | 2092.710 |
| 340 | 109592.00 | 2119.163 |
| 341 | 110967.60 | 2145.763 |
| 242 | 112358.40 | 2172.657 |
| 343 | 113749.20 | 2199.550 |
| 344 | 115178.00 | 2227.179 |
| 345 | 116614.40 | 2254.954 |
| 346 | 118073.60 | 2283.171 |
| 347 | 119632.80 | 2311.387 |
| 348 | 121014.80 | 2340.044 |
| 349 | 122504.40 | 2368.848 |
| 350 | 124001.60 | 2397.799 |
| 351 | 125521.60 | 2427.191 |
| 352 | 127049.20 | 2456.730 |
| 353 | 128599.60 | 2486.710 |
| 354 | 130157.60 | 2516.837 |
| 355 | 131730.80 | 2547.258 |
| 356 | 133326.80 | 2578.119 |
| 357 | 134945.60 | 2609.422 |
| 358 | 136579.60 | 2641.018 |
| 359 | 138228.80 | 2672.908 |
| 360 | 139893.20 | 2705.093 |
| 361 | 141572.80 | 2737.571 |
| 362 | 143273.20 | 2770.490 |
| 363 | 144992.80 | 2803.703 |
| 364 | 146733.20 | 2637.357 |
| 365 | 148519.20 | 2871.892 |
| 366 | 150320.40 | 2906.722 |
| 367 | 152129.20 | 2941.698 |
| 368 | 153960.80 | 2977.116 |
| 369 | 155816.20 | 3012.974 |
| 370 | 157692.40 | 3049.273 |
| 371 | 159584.80 | 3085.866 |
| 372 | 161507.60 | 3123.047 |
| 373 | 163488.40 | 3160.963 |
| 374 | 165467.20 | 3199.613 |

General Safety—In any waste disposal system, safety is always important. With energetic materials (e.g., ordnance) thermal, sensitivity must be accounted for because of the danger of deflagration to detonation. Comparative data are shown in FIG. 5 for TNT and include the time to explosion for confined, heated samples. The time to explosion data define a region of energetic reaction of about 200° C. and tens of hours, extending to temperatures above 400° C. and times of a few seconds. The data line 41 for hydrothermal decomposition appears to be tangential to the autoignition region 42 and meets the boundary between about 250° and 300° C.

The important practical aspects are therefore apparent. When involved with bulk energetic materials (e.g., ordnance) in a hot reactor, there are time and temperature conditions to be avoided.

The experiments are conducted with quantities of TNT well above the ambient temperature solubility limits in water, i.e., the experiments start with solid bulk TNT in the reactor. The TNT decomposes safely and smoothly following first order reaction kinetics. In contrast, it is apparent from FIG. 5 that wet air oxidation and supercritical water oxidation processes are performed well within the TNT autoignition region and are therefore subject to possible unpredictable energetic events.

The following Examples are provided to explain and the describe the invention. They are not to be construed to be limiting in any way.

General—The materials described herein are available from a number of commercial industrial sources., e.g., Dow Chemical, DuPont, Aldrich Chemical, etc. Specific purities and compositions can be found in *Chemical Sources U.S.A.* published annually by Directories Publications, Inc. of Clemson, S.C.

Specific Materials

AP—Solutions of about 2 mM ammonium perchlorate were prepared with unbuffered Milli-Q water.

RDX—A 90–103 μM (20–23 ppm) solution of RDX was prepared by stirring 5–5.7 mg of solid RDX in 250 mL of Milli-Q water overnight. A 5 μM (1.5 ppm) solution of HMX was prepared by stirring 1.5 mg of solid HMX in 1 L of Milli-Q water for three days. These concentrations are half the solubility limits of about 44 ppm and 2.6 ppm, respectively, reported by Spanggord et al. (1980, 1982).

NG—Nitroglycerin was purified by extracting 1.0 g of solid 9:1 lactose:NG with 4 mL of ethyl ether, filtering, and evaporating the ether solution under a stream of air. The residual NG was dissolved in 50 mL of water to prepare a 3.8 mM stock solution and stored at room temperature.

ADN—A 7 mM of solution of ADN was prepared by stirring 86.8 mg of solid ADN in 100 mL of water for a few minutes until all dissolved.

CL-20—Homogeneous solutions of CL-20 in water were prepared by stirring 39.1 mg of solid CL-20 in 100 mL of Milli-Q water in a volumetric flask overnight (15 hr). The mixture was then filtered, and the mass of the dried, recovered material (31.3 mg) showed that only about 20% of the CL-20 had gone into solution. The resulting saturated solution was diluted to about 100 μM and stored at room temperature.

TNT—Reagent grade TNT was used with no further purification. TNT is highly photosensitive, and accordingly all manipulations were done in dim, indirect lighting or in the dark. A stock solution of TNT was prepared by stirring 22.7 mg of solid TNT in 100 mL of Milli-Q water overnight in a stoppered Erlenmeyer flask, wrapped in aluminum foil. This concentration is about half the solubility limit of about 1.0 mM. The solution was filtered and stored in the dark at room temperature.

For the purposes of the present invention the concentration in molarity (or % by weight) for each salt is expressed for the pure salt disregarding any waters of hydration present.

EXAMPLE 1

GENERAL EXPERIMENTAL PROCEDURE

A 5 to 100 μM solution of the waste material nitro compound (e.g. such as TNT) is prepared by stirring the weighed compound in 250 mL of Milli-Q water. The desired amounts of added salts are also weighed and added to the solution, or added directly into the reactor. The solution is then weighed into a glass reactor and the reactor is sealed with a torch. A stainless steel reactor is used when the reaction is performed under pressure. The reactor is heated in a bath at the desired temperature for a specified amount of time. The reaction was quenched by rapid cooling to ambient temperature.

The gaseous products are removed using standard conventional vacuum trap techniques. Analyses are performed on a Hewlett Packard 5711 gas chromatograph with a thermal conductivity detector. The organic products are analyzed with a Hewlett Packard 1090 high pressure liquid chromatograph (HPLC). A diode array detector is used to monitor the compounds at 200 nanometers (nm). Ionic products are analyzed by ion chromatography using a DIONEX 2000i chromatograph having a conductivity detector. All chromatography methods use either a Hewlett Packard 3390 integrator or a DIONEX 4270 integrator. External standards are used to identify and quantitate the reaction products.

EXAMPLE 2

HYDROTHERMOLYSIS OF RDX NG AND TNT

Experiments used to obtain the data points for FIGS. 2 and 3 were standard kinetic experiments is described by S. L. Friess and A. Weissberger, *Rates and Mechanisms of Reactions*, Vol. VIII, published in 1953 by Interscience, Inc. of New York, N.Y.

EXAMPLE 3

Experiments used to obtain the Arrhenius data points for FIGS. 1A, 1B and 4 were standard kinetic experiments are described by S. L. Friess and A. Weissberger, *Rates and Mechanisms of Reactions*, Vol. VIII, published in 1953 by Interscience, Inc. of New York, N.Y.

EXAMPLE 4

RDX—KINETICS

Table 1 shows the results of destruction of RDX at 150° C.

TABLE 1

Hydrothermolytic Destruction of RDX at 150° C. in Liquid, Neutral Water -- Effects of Container Walls

| time, min | % Remaining, Quartz | % Remaining, PYREX ® |
|---|---|---|
| 30 | 64 | 9 |
| 69 | 58 | 0 |
| 120 | 39 | 0 |
| 240 | 18 | 0 |
| 390 | 9 | 0 |

Quartz is essentially 100% silicate. PYREX® (trademark of the Corning Glass Company, Inc., Corning, N.Y.) is silica glass having borate as a component.

From this result it appears that either silicate and/or borate leached into the water during the run and accelerated the hydrothermal decomposition.

EXAMPLE 5

NITROGLYCERIN—KINETICS

Table 2 shows the rate constants for the hydrothermolysis of NG at 150° C.

TABLE 2

Rate Constants for the Hydrothermolysis of NG at 150° C. in Neutral Water

| Conditions | $k_n \times 10^4 (s^{-1})$ |
|---|---|
| Quartz | 2.67 |
| Quartz with 100 µM $N_aB_4O_7$ | 4.80 |
| PYREX ® | 5.93 |
| Quartz with crushed Pyrex | 7.45 |
| Quartz with 100 µM $Na_2SiO_3$ | 18.20 |

This result shows that at least for NG, added silicate was highly effective, but that added catalytic amounts of borate were considerably less effective.

EXAMPLE 6

PRODUCTS OF REACTION—NITROGLYCERIN (NG)

Table 3 is a summary of the neutral hydrolysis products of nitroglycerin.

TABLE 3

Summary of Hydrolysis Products of NG Yields at 150° C.[a]

| Conditions | $C_2O_4=$ | $HOCH_2CO_2-$ | $HCO_2-$ | $HCOCO_2-$ | $NO_2-$ | $NO_3-$ |
|---|---|---|---|---|---|---|
| Quartz Reactor | — | 45.8 | 14.2 | — | — | 94.5 |
| PYREX ® Reactor | — | 29.5 | 19.8 | 2.8 | 10.7 | 69.6 |
| Quartz with crushed PYREX ® | — | — | 97.9 | — | 6.6 | 86.3 |
| Quartz with | — | 24.1 | 17.8 | 9.1 | 14.7 | 65.7 |

TABLE 3-continued

Summary of Hydrolysis Products of NG Yields at 150° C.[a]

| Conditions | $C_2O_4=$ | $HOCH_2CO_2-$ | $HCO_2-$ | $HCOCO_2-$ | $NO_2-$ | $NO_3-$ |
|---|---|---|---|---|---|---|
| $Na_2B_4O_7$ Quartz with $Na_2SiO_3$ | 12.7 | — | 81.4 | | 45.8 | 52.9 |

[a]Reported as final yields in percent of initial NG-nitrogen and NG-carbon, respectively.

This result shows that crushed PYREX® and added silicate shifted the product balance, such that most of the starting carbon ended up simply as formate.

EXAMPLE 7

TNT—KINETICS

Table 4 shows the kinetic effects of added borate and silicate in the destruction of TNT.

TABLE 4

Kinetic Effects of Added Borate and Silicate at 200° C.

| $(Na_2B_4O_7)$ (M) | $k_{salt} \times 10^4$ $(s^{-1})$ | $(Na_2SiO_3)$ (M) | $k_{salt} \times 10^4$ $(s^{-1})$ |
|---|---|---|---|
| $1.0 \times 10^{-6}$ | 2.84 | $1.0 \times 10^{-5}$ | 3.46 |
| $1.0 \times 10^{-4}$ | 5.25 | $1.0 \times 10^{-4}$ | 9.12 |
| $5.0 \times 10^{-4}$ | 13.80 | $3.0 \times 10^{-4}$ | 19.05 |
| $1.0 \times 10^{-3}$ | 77.62 | $1.0 \times 10^{-3}$ | 74.13 |

FIG. 2, shows the kinetic salt effects on the hydrothermolysis of TNT in water at 200° C. The line 21 on the right in the salt-active region is sketched in at unit slope and graphically. FIG. 2 graphically shows the effects of increasing salt, this time including phosphate.

FIG. 3 is a graph of the effects of pH on the hydrothermolysis on TNT. The pH values are for the starting solutions at room temperature. FIG. 3 shows the separation of the effects of the basicity of salt solutions. It demonstrates that while there is a small effect of added base, the bulk of the effects for borate and silicates are due to some type of salt effect.

EXAMPLE 8

HYDROTHERMAL DECOMPOSITIONS OF TNT CRUSHED QUARTZ/AQUEOUS SOLUTION

Crushed quartz (silica, $SiO_2$) in suspension was found to increase the rate of hydrothermal decomposition substantially, presumably due to the introduction of silicate into the aqueous phase.

Experiments were performed on TNT at 180° C. (This temperature was selected as a safety measure). Five to 10 mg of powdered quartz were added to each 10 ml size quartz vial which was then filled with 8 ml of 17.6 ppm TNT as an aqueous solution. A control experiment was performed using same size quartz vials without adding powdered quartz to the solution.

Heating and analysis were performed. Observed results are given in the following Table 5.

TABLE 5

HYDROTHERMAL DECOMPOSITION OF TNT
(Using powdered quartz)

| Time(sec) | TNT(ppm) | TNT + Quartz(ppm) |
|---|---|---|
| 0 | 17.6 | 17.6 |
| 10800 | 15.8 | 2.5 |
| 18000 | 13.6 | 0.4 |

These results clearly show that the addition of insoluble quartz powder has increased the rate of decay at least by an order of magnitude. A decrease in first order decay rate was also observed by changing vial size from 3 to 10 ml at 220° C. All this information is consistent with heterogeneous surface reactions on powdered quartz (silica) during hydrothermal decomposition.

EXAMPLE 9

TNT HYDROTHERMAL DECOMPOSITION a. The hydrothermal decomposition of TNT occurs at a number of pressures, temperatures and times using sodium tetraborate as a catalyst. See Table 6 below. Under these conditions and the intermediate conditions, 99.9% or greater of the TNT is safely decomposed.

Note: For sodium tetraborate, $Na_2B_4O_7$, the molecular weight is 201.19.

Thus, in Table 6 below having a salt concentration of $5 \times 10^{-3}$M, is about 1 gram of salt in 1000 ml (1000 g) water. This corresponds to about 0.1 percent by weight of salt in the water-catalyst present.

The concentration (in % by weight) of salts described in Examples 9, 10 and 11 is easily calculated.

TABLE 6

HYDROTHERMAL DECOMPOSITION OF 2,4,6-TRINITRO-TOLUENE (TNT)
(Using sodium tetraborate as the salt catalyst)

| No. | Temperature (°C.) | Pressure (psi) | Salt (M) | Time for 99.9% destruction (sec) |
|---|---|---|---|---|
| 1 | 200 | 240 | $1 \times 10^{-3}$ | 2000 |
| 2 | 200 | 240 | $5 \times 10^{-3}$ | 600 |
| 3 | 200 | 240 | $1 \times 10^{-2}$ | 100 |
| 4 | 200 | 240 | $1 \times 10^{-1}$ | 6 |
| 5 | 250 | 585 | $1 \times 10^{-3}$ | 150 |
| 6 | 250 | 585 | $4 \times 10^{-3}$ | 600 |
| 7 | 250 | 585 | $1 \times 10^{-3}$ | 10 |
| 8 | 250 | 585 | $1 \times 10^{-1}$ | .6 |
| 9 | 250 | 585 | 1 | .06 |
| 10 | 300 | 1290 | $1 \times 10^{-3}$ | 40 |
| 11 | 300 | 1290 | $1 \times 10^{-2}$ | 2 |
| 12 | 300 | 1290 | $1 \times 10^{-1}$ | .1 |
| 13 | 300 | 1290 | 1 | .01 |
| 14 | 350 | 2490 | $1 \times 10^{-4}$ | 100 |

TABLE 6-continued

HYDROTHERMAL DECOMPOSITION OF 2,4,6-TRINITRO-
TOLUENE (TNT)
(Using sodium tetraborate as the salt catalyst)

| No. | Temperature (°C.) | Pressure (psi) | Salt (M) | Time for 99.9% destruction (sec) |
|---|---|---|---|---|
| 15 | 350 | 2490 | $1 \times 10^{-3}$ | 10 |
| 16 | 350 | 2490 | $1 \times 10^{-2}$ | .8 |
| 17 | 350 | 2490 | $1 \times 10^{-1}$ | .03 | b. Similarly, when the experiments of Table 6 are performed replacing sodium tetraborate with a stoichiometrically equivalent amount of sodium silicate, 99.9% or greater of the TNT is safely decomposed.

c. Similarly, when the experiments of Table 6 are performed replacing sodium tetraborate with a stoichiometrically equivalent amount of trisodium phosphate, 99.9% or greater of the TNT is safely composed.

d. Similarly, when the experiments of Table 6 of Example 9a are performed replacing the TNT with a stoichiometrically equivalent amount of 2,4- or 2,6-dinitrotoluene (DNT) or combinations thereof, 99.9% or greater of the DNT is safely decomposed.

e. Similarly, when the experimental conditions of Table 6 of Example 9b are performed replacing the TNT with a stoichiometrically equivalent amount of 2,4- or 2,6-dinitrotoluene (DNT) or combinations thereof, 99.9% or greater of the DNT is safely decomposed.

f. Similarly, when the experimental conditions of Table 6 of Example 9c are performed replacing the TNT with a stoichiometrically equivalent amount of 2,4- or 2,6-dinitrotoluene (DNT) or combinations thereof, 99.9% or greater of the DNT is safely decomposed.

g. Similarly, when the experiments of Table 6 of Example 9a are performed replacing the TNT with a stoichiometrically equivalent amount of picric acid, 99.9% or greater of the picric acid is safely decomposed.

h. Similarly, when the experimental conditions of Table 6 of Example 9b are performed replacing the TNT with a stoichiometrically equivalent amount of picric acid, 99% or greater of the picric acid is safely decomposed.

i. Similarly, when the experimental conditions of Table 6 of Example 9c are performed replacing the TNT with a stoichiometrically equivalent amount of picric acid, 99% or greater of the picric acid is safely decomposed.

j. The hydrothermal decomposition of TNT, DNT or picric acid occurs at a number of pressures, temperatures and times independently replacing sodium tetraborate of Example 9a, sodium silicate of Example 9b, respectively as a catalyst. See Table 6 above. Under these conditions and the intermediate conditions, 99% or greater of the TNT, DNT or picric acid is safely decomposed.

k. Similarly, when the experimental conditions of Examples 9a to Example 9i above produce a hydrothermal decomposition of TNT, DNT or picric acid of 99.9% or greater, in some experiments the hydrothermal decomposition of TNT, DNT or picric acid is 99.99% or greater.

l. Similarly, when the experimental conditions of Examples 9a to Example 9i above produce a hydrothermal decomposition of TNT, DNT or picric acid of 99.9% or greater, in some experiments the hydrothermal decomposition of TNT, DNT or picric acid is 99.999% or greater.

EXAMPLE 10

RDX HYDROTHERMAL DECOMPOSITION a. The hydrothermal decomposition of RDX occurs at a number of pressures temperatures and times using sodium tetraborate as a catalyst. See Table 7 below. Under these conditions and the intermediate conditions, 99.9% or greater of the RDX is safely decomposed.

TABLE 7

HYDROTHERMAL DECOMPOSITION OF RDX
(Using sodium tetraborate as the salt catalyst)

| No. | Temperature (°C.) | Pressure (psi) | Salt (M) | Time for 99.9% destruction (sec) |
|---|---|---|---|---|
| 1 | 150 | 69 | $1 \times 10^{-3}$ | 1200 |
| 2 | 150 | 69 | $1 \times 10^{-2}$ | 120 |
| 3 | 150 | 69 | $1 \times 10^{-1}$ | 12 |
| 4 | 150 | 69 | 1 | 1.2 |
| 5 | 200 | 240 | $5 \times 10^{-4}$ | 600 |
| 6 | 200 | 240 | $1 \times 10^{-4}$ | 300 |
| 7 | 200 | 240 | $1 \times 10^{-3}$ | 30 |
| 8 | 200 | 240 | $1 \times 10^{-2}$ | 3 |
| 9 | 200 | 240 | $1 \times 10^{-1}$ | .3 |
| 10 | 200 | 240 | 1 | .03 |
| 11 | 250 | 585 | $1 \times 10^{-5}$ | 200 |
| 12 | 250 | 585 | $1 \times 10^{-4}$ | 20 |
| 13 | 250 | 585 | $1 \times 10^{-3}$ | 2 |
| 14 | 250 | 585 | $10 \times 10^{-2}$ | .2 |
| 15 | 250 | 585 | $10 \times 10^{-1}$ | 0.02 | b. Similarly, when the experiments of Table 7 are performed replacing sodium tetraborate with a stoichiometrically equivalent amount of sodium silicate, 99.9% or greater of the RDX is safely decomposed.

c. Similarly, when the experiments of Table 7 are performed replacing sodium tetraborate with a stoichiometrically equivalent amount of trisodium phosphate, 99.9% or greater of the RDX is safely decomposed.

d. Similarly, when the experiments of Table 7 of Example 10a are performed replacing the RDX with a stoichiometrically equivalent amount of HMX, 99.9% or greater of the HMX is safely decomposed.

e. Similarly, when the experimental conditions of Table 7 of Example 10b are performed replacing the RDX with a stoichiometrically equivalent amount of HMX, 99.9% or greater of the HMX is safely decomposed.

f. Similarly, when the experimental conditions of Table 7 of Example 10c are performed replacing the RDX with a stoichiometrically equivalent amount of HMX, 99.9% or greater of the HMX is safely decomposed.

g. The hydrothermal decomposition of RDX or HMX occurs at a number of pressures temperatures and times independently replacing sodium tetraborate of Example 10a, sodium silicate of Example 10b, respectively, as a catalyst. See Table 7 above. Under these conditions and the intermediate conditions, 99.9% or greater of the RDX or HMX is safely decomposed.

h. Similarly, when the experimental conditions of Example 10a to Example 10g above produce a hydrothermal decomposition of RDX or HMX of 99.9% or greater, in some experiments the hydrothermal decomposition of RDX or HMX is 99.99% or greater.

i. Similarly, when the experimental conditions of Examples 10a to Example 10g above produce a hydrothermal decomposition of RDX or HMX of 99% or greater, in some experiments the hydrothermal decomposition of RDX or HMX or is 99.999% or greater.

EXAMPLE 11

NITROGLYCERIN (NG) HYDROTHERMAL DECOMPOSITION a. The hydrothermal decomposition of NG occurs at a number of pressures temperatures and times using sodium tetraborate as a catalyst. See Table 8 below. Under these conditions and the intermediate conditions, 99% or greater of the NG is safely decomposed.

TABLE 8

HYDROTHERMAL DECOMPOSITION OF NITROGLYCERIN (NG)
(Using sodium tetraborate as the salt catalyst)

| No. | Temperature (°C.) | Pressure (psi) | Salt (M) | Time for 99.9% destruction (sec) |
|---|---|---|---|---|
| 1 | 150 | 69 | $1 \times 10^{-4}$ | 5000 |
| 2 | 150 | 69 | $1 \times 10^{-3}$ | 505 |
| 3 | 150 | 69 | $1 \times 10^{-2}$ | 55 |
| 4 | 150 | 69 | $1 \times 10^{-1}$ | 5 |
| 5 | 200 | 240 | $1 \times 10^{-5}$ | 600 |
| 6 | 200 | 240 | $1 \times 10^{-4}$ | 60 |
| 7 | 200 | 240 | $1 \times 10^{-3}$ | 6 |
| 8 | 200 | 240 | $1 \times 10^{-2}$ | .6 |
| 9 | 250 | 585 | $1 \times 10^{-4}$ | .9 |
| 10 | 250 | 585 | $1 \times 10^{-3}$ | 9 | b. Similarly, when the experiments of Table 8 are performed replacing sodium tetraborate with a stoichiometrically equivalent amount of sodium silicate, 99% or greater of the NG is safely decomposed.

c. Similarly, when the experiments of Table 8 are performed replacing sodium tetraborate with a stoichiometrically equivalent amount of trisodium phosphate, 99% or greater of the NG is safely decomposed.

d. Similarly, when the experiments of Table 8 of Example 11a are performed replacing the NG with a stoichiometrically equivalent amount of pentaerythritoltetranitrate, 99% or greater of the pentaerythritoltetranitrate is safely decomposed.

e. Similarly, when the experimental conditions of Table 8 of Example 11b are performed replacing the NG with a stoichiometrically equivalent amount of pentaerythritoltetranitrate, 99.9% or greater of the pentaerythritoltetranitrate is safely decomposed.

f. Similarly, when the experimental conditions of Table 8 of Example 11c are performed replacing the NG with a stoichiometrically equivalent amount of pentaerythritoltetranitrate, 99.9% or greater of the pentaerythritoltetranitrate is safely decomposed.

g. The hydrothermal decomposition of NG occurs at a number of pressures temperatures and times independently replacing sodium tetraborate of Example 11a, sodium silicate of Example 11b, respectively as a catalyst. See Table 8 above. Under these conditions and the intermediate conditions, 99.9% or greater of the NG is safely decomposed.

h. Similarly, when the experimental conditions of Example 11a to Example 11g above produce a hydrothermal decomposition of NG or pentaerythritoltetranitrate is 99.9% or greater, in some experiments the hydrothermal decomposition of NG or pentaerythritoltetranitrate is 99.99% or greater.

i. Similarly, when the experimental conditions of Examples 11a to Example 11g above produce a hydrothermal decomposition of NG or pentaerythritoltetranitrate of 99.9% or greater, in some experiments the hydrothermal decomposition of NG or pentaerythritoltetranitrate is 99.999% or greater.

EXAMPLE 12

TNT DECOMPOSITION WITH A PROMOTER REAGENT

The hydothermal decomposition of TNT is according to the general experimental procedures above described in Example 1 wherein the promoting reagent of sodium nitrite is used. A graphic representation of the results are shown in FIG. 9. An increase in rate of decomposition with sodium nitrite is demonstrated.

Table AA shows the products of resulting from reacting TNT alone (residue remains), TNT and 3% $NaNO_2$ (produces a colorless solution) and 3% $NaNO_2$ alone (produces a colorless solution). The added sodium nitrite strikingly eliminates the organic residue and clearly increases the conversion of carbon to $CO_2$/bicarbonate by a factor greater than 4. Nitrogen conversion was also substantially improved. Table AA shows that sodium nitrite itself is essentially stable under the conditions, and the consumption of nitrite in the reaction with TNT reflects some manner of stoichiometric reaction, rather than a catalyzed conversion.

TABLE AA

PRODUCTS FROM THE HYDROTHERMOLYSIS OF TNT AND SODIUM NITRITE AT 300° C./120 MIN[a]

| | | Fraction of Starting C/N (%)[b] | | |
|---|---|---|---|---|
| Phase | Product | TNT alone | TNT and 3% $NaNO_2$ | 3% $NaNO_2$ alone |
| Carbon | | | | |
| gas | $CO_2$ | 17 | 13 | — |
| | CO | 1 | —[d] | — |
| | $CH_4$ | —[d] | —[d] | — |
| solution | acetate | 4 | 11 | — |
| | formate | —[d] | —[d] | — |
| | glycolate | —[d] | 1 | — |
| | oxalate | —[d] | —[d] | — |
| | bicarbonate | —[d] | 61 | — |
| recovered solid | — | 62 | none[c] | — |
| Total C accounted for | | 84 | 85 | — |
| Nitrogen | | | | |
| gas | $N_2O$ | —[d] | 14 | —[d] |
| | $N_2$ | 30 | 28 | 2 |
| solution | nitrite | —[d] | 35 | 90 |
| | nitrate | —[d] | 2 | 1 |
| | ammonium | 28 | 8 | —[d] |
| recovered solid | — | 31 | none[c] | — |
| Total N accounted for | | 89 | 87 | 93 |

[a]. Complete conversion; no detectable TNT remained.
[b]. Reported as final yields in percent of initial carbon and nitrogen.
[c]. A small quantity of a white solid was recovered, and is likely silica derived from the quartz liner of the reactor.
[d]. Trace quantities recovered.

EXAMPLE 13

HBX DECOMPOSITION WITH PROMOTING REAGENT

The hydrothermal decomposition of HBX is according to the general experimental procedures above described in Example 1 wherein the promoting reagent of sodium nitrite is used. Experiments were performed on HBX-3 at 300° C. for 45 minutes and HBX-1 at 230° C. for 180 minutes.

Below are three tables showing data on the use of sodium nitrite (referred to here as a promoter) with HBX, an energetic composite. The compositions of the two HBX versions are in Table BB, and the experimental results in Table CC (no nitrite) and Table DD (with nitrite).

TABLE BB

Composition of HBX-1 and HBX-3[a]

| Component | HBX-1 | HBX-3 |
|---|---|---|
| RDX | 40% | 31% |
| TNT | 38% | 29% |
| Al | 17% | 35% |
| Wax | 5% | 5% |
| Calcium chloride | <1% | <1% |
| Calcium silicate | <1% | <1% |

[a]Fedoroff and Shefield, 1975.

TABLE CC

PRODUCTS FROM THE HYDROTHERMOLYSIS OF HBX-3 ALONE 230° C./120 MIN.

| Phase | Product | Fractions of Starting C/N (%)[a] |
|---|---|---|
| Carbon | | |
| Gas | $CO_2$ | 28 |
| | CO | 2 |
| | $CH_4$ | —[b] |
| Solution | Acetate | 0.5 |
| Formate | 3 | |
| | Glycolate | 1 |
| | Oxalate | 1 |
| | Bicarbonate | —[b] |
| Recovered solid | — | 50 |
| Total C accounted for | | 86 |
| Nitrogen | | |
| Gas | $N_2O$ | 59 |
| | $N_2$ | 22 |
| Solution | Nitrite | —[b] |
| | Nitrate | 0.5 |
| | Ammonium | 5 |
| Recovered solid | — | 4 |
| Total N accounted for | | 91 |

[a]Reported as final yields in percent of initial carbon and nitrogen.
[b]Trace quantities.

Table CC shows that 86% of the starting carbon and 91% of the starting nitrogen could be accounted for. Most of the carbon was recovered as a carbonaceous residue that contains only a small quantity of nitrogen. The major fraction of the recovered nitrogen is as $N_2O$ and $N_2$. This result is consistent with results from our Air Force study.

TABLE DD

PRODUCTS FROM THE HYDROTHERMOLYSIS OF HBX-1 AND HBX-3

| | | Fraction of Starting C/N (%)[a] | |
|---|---|---|---|
| Phase | Product | HBX-3 with a Promoter 300° C./45 min | HBX-1 with a Promoter 230°C./180 min |
| Carbon | | | |
| Gas | $CO_2$ | 21 | 15 |
| | CO | 6 | —[b] |
| | $CH_4$ | 2 | 6 |
| Solution | Acetate | —[b] | —[b] |
| | Formate | —[b] | 12 |
| | Glycolate | —[b] | 3 |
| | Oxalate | —[b] | 1 |
| | Bicarbonate | 72 | 56 |
| Recovered solid | — | None | None |
| Total C accounted for | | 101 | 93 |
| Nitrogen | | | |
| Gas | $N_2O$ | 53 | 35 |
| | $N_2$ | 32 | 39 |
| Solution | Nitrite | —[b] | —[b] |
| | Nitrate | 4 | 8 |
| | Ammonium | 10 | 8 |
| Recovered Solid | — | None | None |
| Total N accounted for | | 99 | 90 |

[a]Reported as final yields in percent of initial carbon and nitrogen.
[b]Trace quantities.

Table DD shows that in both cases there is an excellent C and N recovery, and no residue is formed. The nitrogen results are similar to those in Table CC for decompositions without any added material; the major change is in the carbon recovery, where in these cases the C-products are primarily $CO_2$, formate, and bicarbonate.

EXAMPLE 14

COMP B DECOMPOSITION WITH PROMOTING REAGENT

The hydrothermal decomposition of COMP B is according to the general experimental procedures above described in Example 1 wherein the promoting reagent of sodium nitrite is used. Experiments were performed on COMP B at 300° C. for 60 minutes. COMP B is 60% RDX, 40% TNT, 1% wax. Table EE shows that added nitrite eliminates the formation of a solid residue.

TABLE EE

PRODUCTS FROM THE HYDROTHERMOLYSIS OF COMP B WITH ADDED NITRATE AT 300° C./60 MIN

| | | Fraction of Starting C/N (%)[a] | |
|---|---|---|---|
| Phase | Product | Comp B alone 240 min | Comp B plus nitrite 60 min |
| Carbon | | | |
| gas | $CO_2$ | 16 | 26 |
| | CO | 1 | —[b] |
| | $CH_4$ | | 1 |
| solution | acetate | 3 | —[c] |
| | formate | 1 | —[c] |
| | glycolate | 3 | —[c] |
| | oxalate | 2 | —[c] |
| | bicarbonate | | 66 |
| recovered solid | — | 48 | 0 |
| Total C accounted for | | 74 | 93 |
| Nitrogen | | | |
| gas | $N_2O$ | 10 | 38 |
| | $N_2$ | 42 | 25 |
| solution | nitrite | —[b] | 30 |
| | nitrate | 1 | 6 |

TABLE EE-continued

PRODUCTS FROM THE HYDROTHERMOLYSIS OF
COMP B WITH ADDED NITRATE AT 300° C./60 MIN

| | | Fraction of Starting C/N (%)[a] | |
|---|---|---|---|
| Phase | Product | Comp B alone 240 min | Comp B plus nitrite 60 min |
| | ammonium | 16 | 4 |
| recovered solid | — | 8 | 0 |
| Total N accounted for | | 77 | 103 |

[a]Reported as final yields in percent of initial carbon and nitrogen.
[b]Trace quantities
[c]Not detected B. A process of claim 1 (or text A) wherein below:
the waste material is ordnance waste;
the salt is independently selected from sodium borate, potassium borate, sodium silicate, potassium silicate, trisodium phosphate, tripotassium phosphate or combinations thereof; and
the temperature of step (b) is between about 200° and 374° C. at the autogenic saturated vapor pressure of water.

C. The process of A wherein the temperature in step (b) is between about 300° and 373° C.

D. The process of A wherein the hydrothermal decomposition in step (b) or hydrothermal conversion of step (b) and coupled with step (d) is 99.99% by weight or greater.

E. The process of B wherein the hydrothermal decomposition of step (b) or the hydrothermal conversion of step (d) coupled with the reaction of step (d) is 99.9% or greater by weight of the starting waste material.

F. The process of E wherein the temperature in step (b) is between about 250° and 350° C.

G. The process of E wherein the temperature in step (b) is between about 300° and 373° C.

H. The process of A wherein the hydrothermal decomposition of step (b), the hydrothermal conversion of step (c) and or optionally when coupled with step (c) is 99.999% by weight or greater.

I. The process of B wherein the hydrothermal decomposition of step (b) or the hydrothermal conversion of step (b) with the reaction of step (d) is 99.999% or greater by weight of the starting waste material.

J. The process of H wherein the temperature in step (b) is between about 250° and 350° C.

K. The process of I wherein the temperature in step (b) is between about 300° and 373° C.

L. The process of A wherein the aqueous composition of step (b) comprises silica, sodium borate, sodium silicate, magnesium borate, magnesium silicate, calcium borate, calcium silicate or combinations thereof.

M. The process of L wherein:
the temperature of step (b) is between about 200° and 373° C. at the autogenic saturated vapor pressure of water; and the waste is ordnance waste.

N. The process of A wherein the reaction temperature in step (b) is between about 300° and 373° C.

O. The process of B wherein the temperature in step (b) is between about 300° and 373° C.

While only a few embodiments of the invention have been shown and described herein, it will become apparent to those skilled in the art that various modifications and changes can be made in the catalytic conversion of hydrothermally lablie chemical groups and compounds to species which are environmentally acceptable, or are amendable to further degradation without departing from the spirit and scope of the present invention. All such modifications and changes coming within the scope of the appended claims are intended to be carried out thereby.

We claim:

1. A process for the disposal of waste or the conversion of hydrothermally labile chemical groups and compounds by hydrothermal decomposition to compounds which are environmentally acceptable, or are amenable to further degradation by conventional disposal systems to produce environmentally acceptable products, which process comprises:

(a) conveying an aqueous solution or slurry of the waste material into a reaction zone capable of withstanding the temperatures and pressures of the hydrothermal decomposition;

(b) reacting the waste material in the reaction zone with an aqueous composition comprising a promoting reagent independently selected from alkali metal nitrite, alkaline earth metal nitrite or combinations thereof at between 200 C. and 500 C. and at a pressure between 20 and 400 atmospheres for between about 0.01 and 10 minutes wherein water as a liquid is always present with the proviso that no oxidant or transition metal catalyst is added to the reaction mixture;

(c) producing 99.9% or greater decomposition of the waste material or 99.9% or greater conversion of the waste material to compounds which are environmentally acceptable or are amenable to further degradation; and (d) optionally degrading further the compounds of step (c) by reaction to environmentally acceptable products.

2. The process of claim 1 where the waste material is independently selected from ordnance waste, dairy waste, pharmaceutical waste, chemical agents, chemical by-products, chemical waste, agricultural waste or combinations thereof.

3. The process of claim 2 wherein the temperature in step (b) is between about 200° and 373° C.

4. The process of claim 2 wherein the ordnance waste is selected from nitrate esters, nitramines or nitroarenes.

5. The process of claim 4 wherein the nitrate esters are independently selected from nitroglycerin or pentaerythritoltetranitrate, the nitramines are selected from cyclotrimethylenetrinitramine (RDX) or cyclotetramethylenetetranitramine (HMX) and the nitroarenes are selected from 2,4,6-trinitrotoluene (TNT), 2,4,6-trinitropicramine, N-nitroamines or picric acid.

6. The process of claim 3 wherein the promoting reagent refers to salt compounds independently selected from sodium nitrite, potassium nitrite, calcium nitrite, magnesium nitrite, lithium nitrite, rubidium nitrite, cesium nitrite, francium nitrite or combinations thereof.

7. The process of claim 6 wherein the salt is independently selected from sodium nitrite, or potassium nitrite, or combinations thereof.

8. The process of claim 3 wherein in step (b) the temperature is between 250° and 373° C., the pressure is between about 20 and 200 atmospheres and the time is between about 0.1 and 5 min.

9. The process of claim 1 wherein in step (d) the conventional disposal system is a conventional municipal disposal system.

10. The process of claim 1 wherein step (d) is not performed.

11. The process of claim 1, wherein:
the promoting reagent is selected from the group consisting of sodium nitrite, potassium nitrite or combinations thereof.

* * * * *